(12) United States Patent
Lobb et al.

(10) Patent No.: US 9,782,680 B2
(45) Date of Patent: Oct. 10, 2017

(54) PERSISTENT CUSTOMIZED SOCIAL MEDIA ENVIRONMENT

(75) Inventors: Kenneth A. Lobb, Sammamish, WA (US); Arnold Blinn, Hunts Point, WA (US); Bernhard Kotzenberg, Bellevue, WA (US); Donald M. Gillett, Bellevue, WA (US); John Darren Elliott, Lake Forest Park, WA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 384 days.

(21) Appl. No.: 13/315,946

(22) Filed: Dec. 9, 2011

(65) Prior Publication Data

US 2013/0151603 A1 Jun. 13, 2013

(51) Int. Cl.
*G06F 15/16* (2006.01)
*A63F 13/795* (2014.01)
*G06Q 50/00* (2012.01)
*A63F 13/843* (2014.01)

(52) U.S. Cl.
CPC ........... *A63F 13/795* (2014.09); *G06Q 50/01* (2013.01); *A63F 13/843* (2014.09); *A63F 2300/1075* (2013.01); *A63F 2300/556* (2013.01); *A63F 2300/8023* (2013.01); *A63F 2300/8088* (2013.01)

(58) Field of Classification Search
CPC ..................................................... H04N 21/00
USPC .......................... 725/46; 709/204; 705/14.49
See application file for complete search history.

(56) References Cited

U.S. PATENT DOCUMENTS

| 7,200,857 B1 | 4/2007 | Rodriguez et al. |
| 7,624,416 B1 | 11/2009 | Vandermolen et al. |
| 7,840,903 B1 | 11/2010 | Amidon et al. |
| 2002/0083451 A1 | 6/2002 | Gill et al. |

(Continued)

FOREIGN PATENT DOCUMENTS

| CN | 101849229 A | 9/2010 |
| CN | 101897185 A | 11/2010 |

(Continued)

OTHER PUBLICATIONS

Response to Office Action dated Apr. 19, 2013, U.S. Appl. No. 12/970,855, filed Dec. 16, 2010.

(Continued)

*Primary Examiner* — Glenford Madamba
(74) *Attorney, Agent, or Firm* — Vierra Magen Marcus LLP

(57) ABSTRACT

One or more persistent customized social media environments are created allowing users to share content or an activity. The content or activity may comprise a shared media experience or shared participatory experience. Each user accessing the environment utilizes a device alone or in conjunction with other devices to complete a sharing experience. A persistent customized social media environment definition establishes a user environment which provides social networking services as well as content sharing and allows users who are connected to the persistent customized social media environment definition to experience instant messages, while those users who connect to the persistent customized social media environment at a later time will receive messages once they enter the environment.

13 Claims, 19 Drawing Sheets

(56) References Cited

U.S. PATENT DOCUMENTS

| | | | |
|---|---|---|---|
| 2004/0098754 A1 | 5/2004 | Vella et al. | |
| 2006/0173985 A1 | 8/2006 | Moore | |
| 2006/0271997 A1 | 11/2006 | Jacoby et al. | |
| 2007/0255807 A1 | 11/2007 | Hayashi et al. | |
| 2007/0271338 A1 | 11/2007 | Anschutz | |
| 2007/0283380 A1* | 12/2007 | Aoki et al. | 725/32 |
| 2008/0154908 A1 | 6/2008 | Datar et al. | |
| 2008/0172464 A1 | 7/2008 | Thattai et al. | |
| 2008/0222295 A1* | 9/2008 | Robinson et al. | 709/227 |
| 2008/0235592 A1* | 9/2008 | Trauth | G06F 3/0482 715/733 |
| 2008/0301232 A1* | 12/2008 | Facemire | H04N 7/15 709/205 |
| 2008/0317439 A1 | 12/2008 | Wong et al. | |
| 2009/0165140 A1* | 6/2009 | Robinson | G06Q 30/02 726/26 |
| 2009/0249224 A1 | 10/2009 | Davis et al. | |
| 2009/0293079 A1 | 11/2009 | McKee et al. | |
| 2009/0328122 A1 | 12/2009 | Amento et al. | |
| 2010/0063969 A1 | 3/2010 | Kasargod et al. | |
| 2010/0088121 A1 | 4/2010 | Shih et al. | |
| 2010/0153989 A1 | 6/2010 | Jing et al. | |
| 2010/0194762 A1 | 8/2010 | Latta et al. | |
| 2010/0197390 A1 | 8/2010 | Craig et al. | |
| 2010/0199230 A1 | 8/2010 | Latta et al. | |
| 2010/0241579 A1 | 9/2010 | Bassett et al. | |
| 2010/0245536 A1* | 9/2010 | Huitema | H04N 7/147 348/14.08 |
| 2010/0302395 A1 | 12/2010 | Mathe et al. | |
| 2010/0303289 A1 | 12/2010 | Polzin et al. | |
| 2010/0306655 A1 | 12/2010 | Mattingly et al. | |
| 2010/0306713 A1 | 12/2010 | Geisner et al. | |
| 2011/0025689 A1 | 2/2011 | Perez et al. | |
| 2011/0041153 A1* | 2/2011 | Simon et al. | 725/46 |
| 2011/0080336 A1 | 4/2011 | Leyvand et al. | |
| 2011/0099263 A1 | 4/2011 | Patil et al. | |
| 2011/0244954 A1* | 10/2011 | Goldman | A63F 13/65 463/30 |
| 2012/0072936 A1 | 3/2012 | Small et al. | |
| 2012/0226806 A1 | 9/2012 | Knight et al. | |
| 2013/0038510 A1 | 2/2013 | Brin et al. | |
| 2013/0044042 A1 | 2/2013 | Olsson et al. | |

FOREIGN PATENT DOCUMENTS

| | | |
|---|---|---|
| WO | 2006065005 A1 | 6/2006 |
| WO | WO2009/067670 A1 | 5/2009 |

OTHER PUBLICATIONS

Final Office Action dated Aug. 30, 2013, U.S. Appl. No. 12/970,855, filed Dec. 16, 2010.
Office Action dated Dec. 19, 2012, in U.S. Appl. No. 12/970,855, filed Dec. 16, 2010.
Examination Report dated Dec. 18, 2013, European Patent Application No. 12196226.0.
Response to Office Action dated Feb. 27, 2014, U.S. Appl. No. 12/970,855, filed Dec. 16, 2010.
Amendment dated Nov. 23, 2012, Chinese Patent Application No. 201110440194.3 filed Dec. 15, 2011.
Office Action dated Dec. 10, 2013, Chinese Patent Application No. 201110440194.3 filed Dec. 15, 2011.
Amendment dated Apr. 25, 2014, Chinese Patent Application No. 201110440194.3 filed Dec. 15, 2011.
Office Action dated May 6, 2014, Chinese Patent Application No. 201110440194.3 filed Dec. 15, 2011.
Cesar et al. "Enhancing Social Sharing of Videos: Fragment, Annotate, Enrich, and Share". Proceedings of the 2008 ACM Multimedia Conference. Oct. 27-31, 2008, State College, PA, USA. 10 pages.
Martin et al. "neXtream: A Multi-Device, Social Approach to Video Content Consumption". Proceedings of the 2010 Consumer Communications & Networking Conference. Jan. 9-12, 2010, Las Vegas, Nevada, USA. 5 pages.
van Aart, et al. "The NoTube BeanCounter: Aggregating User Data for Television Programme Recommendation". Proceedings of the Workshop on Social Data on the Web (sDoW2009) at the 8th International Semantic Web Conference. Oct. 25, 2009, Washington D.C., USA. 12 pages.
Office Action dated Jun. 4, 2014, U.S. Appl. No. 12/970,855, filed Dec. 16, 2010.
Office Action dated Dec. 17, 2014, in U.S. Appl. No. 12/970,855, filed Dec. 16, 2010.
Amendment dated Sep. 4, 2014, in U.S. Appl. No. 12/970,855, filed Dec. 16, 2010.
Office Action dated Oct. 30, 2014, in Chinese Patent Appl. No. 201110440194.3 filed Dec. 15, 2011.
European Search Report dated Nov. 28, 2013, in European Patent Application No. 12196226.0 filed Dec. 10, 2012.
Response dated Jul. 21, 2014, in Chinese Patent Appl. No. 201110440194.3 filed Dec. 15, 2011.
Office Action with English translation dated May 13, 2015 in Chinese Patent Application No. 201110440194.3, 11 pages.
Office Action dated Jun. 26, 2015 in U.S. Appl. No. 12/970,855, 25 pages.
Response to Office Action dated Jan. 14, 2015, in Chinese Patent Application No. 201110440194.3 filed Dec. 15, 2011, 12 pages.
Response to Office Action dated Apr. 17, 2015, in U.S. Appl. No. 12/970,855, filed Dec. 16, 2010, 15 pages.
Response to Office Action dated Nov. 16, 2015 in European Patent Application No. 12196226.0, 19 pages.
Final Office Action dated Nov. 24, 2015 in U.S. Appl. No. 12/970,855, 32 pages.
Response to Office Action dated Feb. 4, 2016 in U.S. Appl. No. 12/970,855, 14 pages.
Office Action dated Jul. 16, 2015 in European Patent Application No. 12196226.0, 4 pages.
Response to Office Action dated Sep. 22, 2015 in U.S. Appl. No. 12/970,855, 16 pages.
Office Action dated Jul. 18, 2016 in U.S. Appl. No. 12/970,855, 30 pages.
Office Action (Summons to attend oral proceedings) dated Apr. 18, 2016 in European Patent Application No. 12196226.0, 6 pages.
Response to Office Action dated Oct. 18, 2016 in U.S. Appl. No. 12/970,855, 17 pages.
Final Office Action dated Dec. 16, 2016 in U.S. Appl. No. 12/970,855, 42 pages.

* cited by examiner

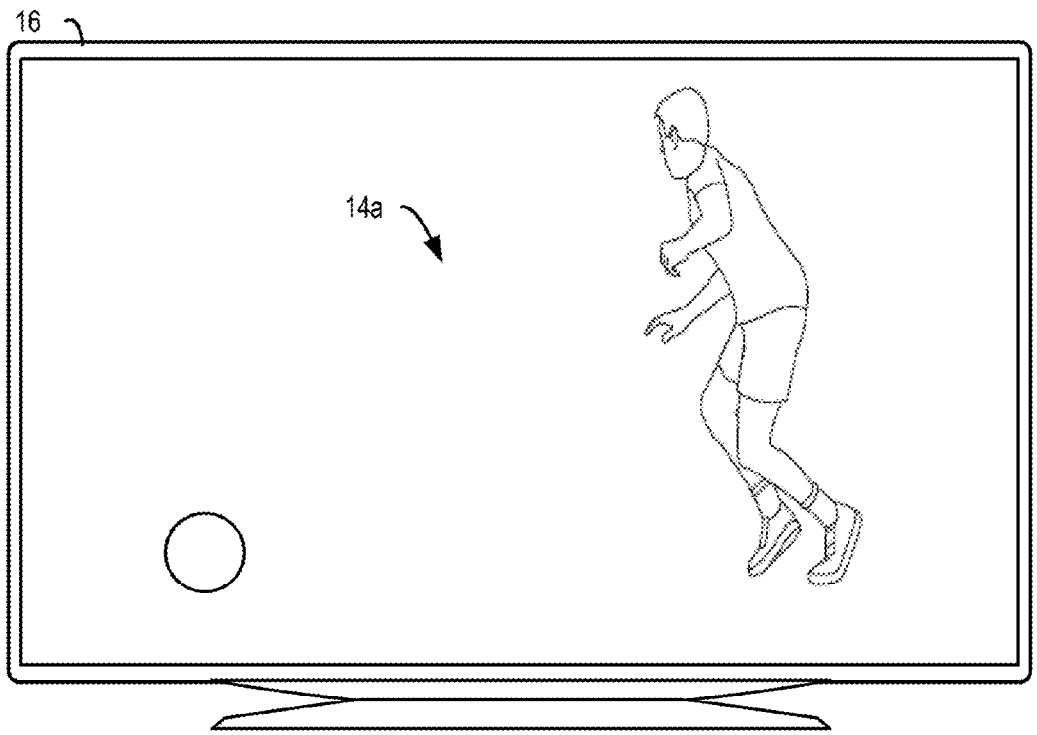
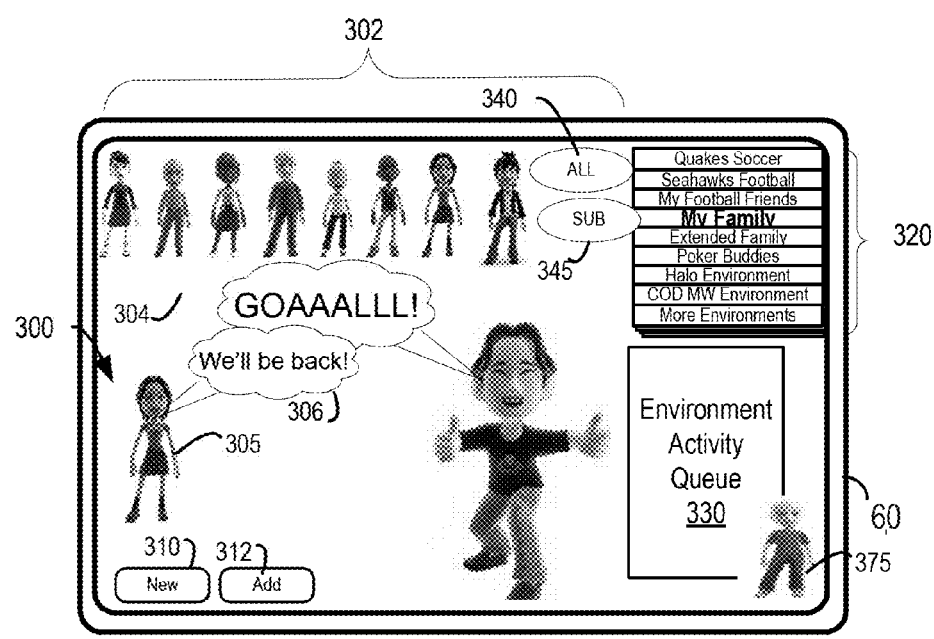
Fig. 3

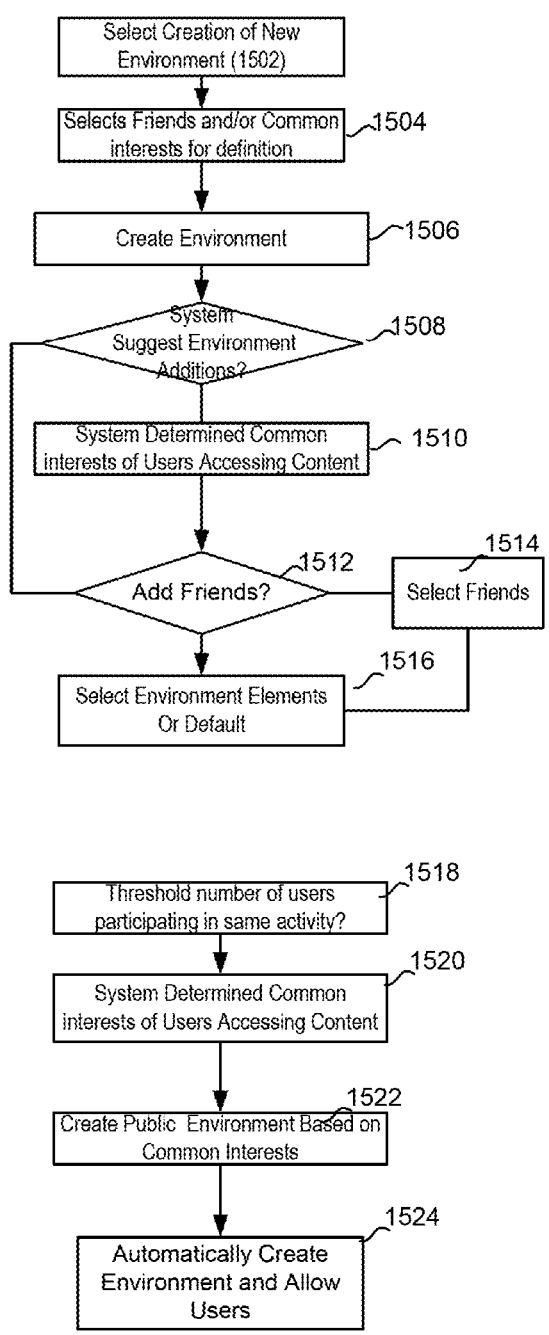
Fig. 15A / Fig. 15B
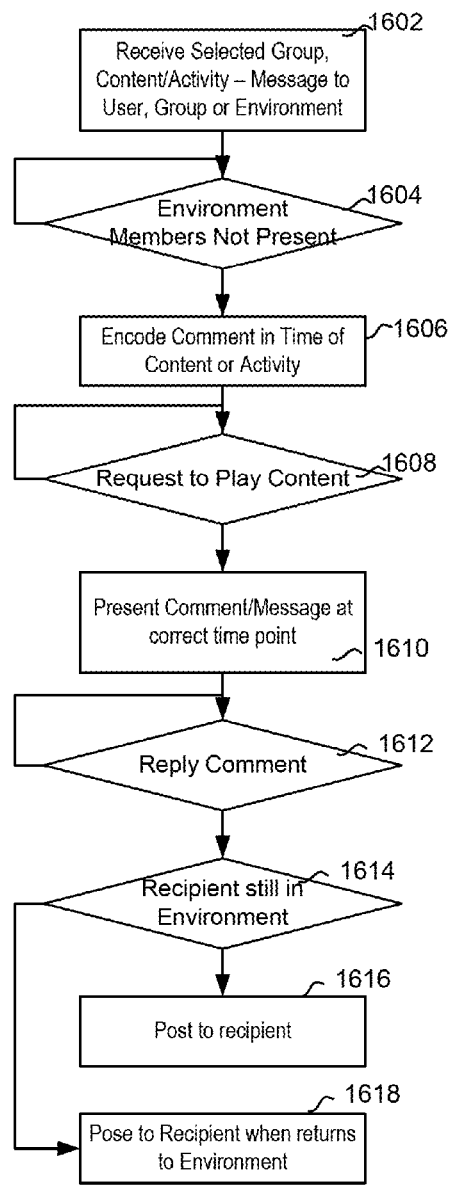
Fig. 16

PERSISTENT CUSTOMIZED SOCIAL MEDIA ENVIRONMENT

BACKGROUND

Light and powerful processing devices such as phones, digital assistants, tablet computers and laptops, have become more commonplace. It has become more common to share media experiences, such as watching television and viewing sporting events, while simultaneously using a portable processing device. It has also become common to desire to share media content with social networking friends.

Currently, users may share media using a variety of means, including email, text messages, and social networking sites, all of which are designed primarily around relationships. In order to share a media experience, a user must either share the media within the context it is presented (for example, upload and share a video within a social network) or navigate to the location where the experience is presented (such as a video site) to obtain a link to the media and select a different application (a social network or email) to share the media. While users can all share a chat room when watching a media presentation, there is no easy mechanism to alert friends to be in the chat room when the media is presented.

SUMMARY

Persistent customized social media environments are created around content or activities for one or more users who access the environment to share content or activity. The content or activity may comprise a shared media experience, such as a television program or shared participatory experience, such as a game. Each user accessing the persistent customized social media environment utilizes a user device which may comprise televisions, tablet computers, personal computers, mobile devices, laptops, or the like, and may be used alone or in conjunction with other devices to complete a sharing experience. The user may access the persistent customized social media environment with one device or multiple devices simultaneously. A persistent customized social media environment definition establishes a user environment which provides a social experience around the shared content or activity. The technology allows for the presentation of different types of content and social experiences to be gathered into a single user experience environment.

In one aspect, a user selects to consume content or participate in an activity using, for example, a persistent customized social media application. While consuming the content or activity, the user is automatically matched to a persistent customized social media environment and joined to that environment. The environment allows for various forms of communication and content sharing amongst the people in that environment, as well as to other applications on the Internet. In addition, the technology allows for seamlessly launching applications from within the environment. The applications can be created by a content provider or selected by users of the environment. The technology thus provides a mechanism to enjoy interactive content as well as synced content. Users can form their own private environments, where only invited friends may join. Each public or private environment created is persistent. Content generated in the environment is leveraged as meta-tagged data to further enrich future uses of that content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a block diagram illustrating two screens, a display screen and an input screen, on two devices illustrating a user interface and content provided by the technology.

FIG. 15 is a flow chart illustrating a method of creating of a new persistent customized social media environment definition.

FIG. 14 is a block diagram illustrating a method for determining of common interest in accordance with the present technology.

FIG. 16 is a block diagram illustrating a feature of the present technology of syncing content to user comments provided in accordance with the present technology.

DETAILED DESCRIPTION

Figure 1A:
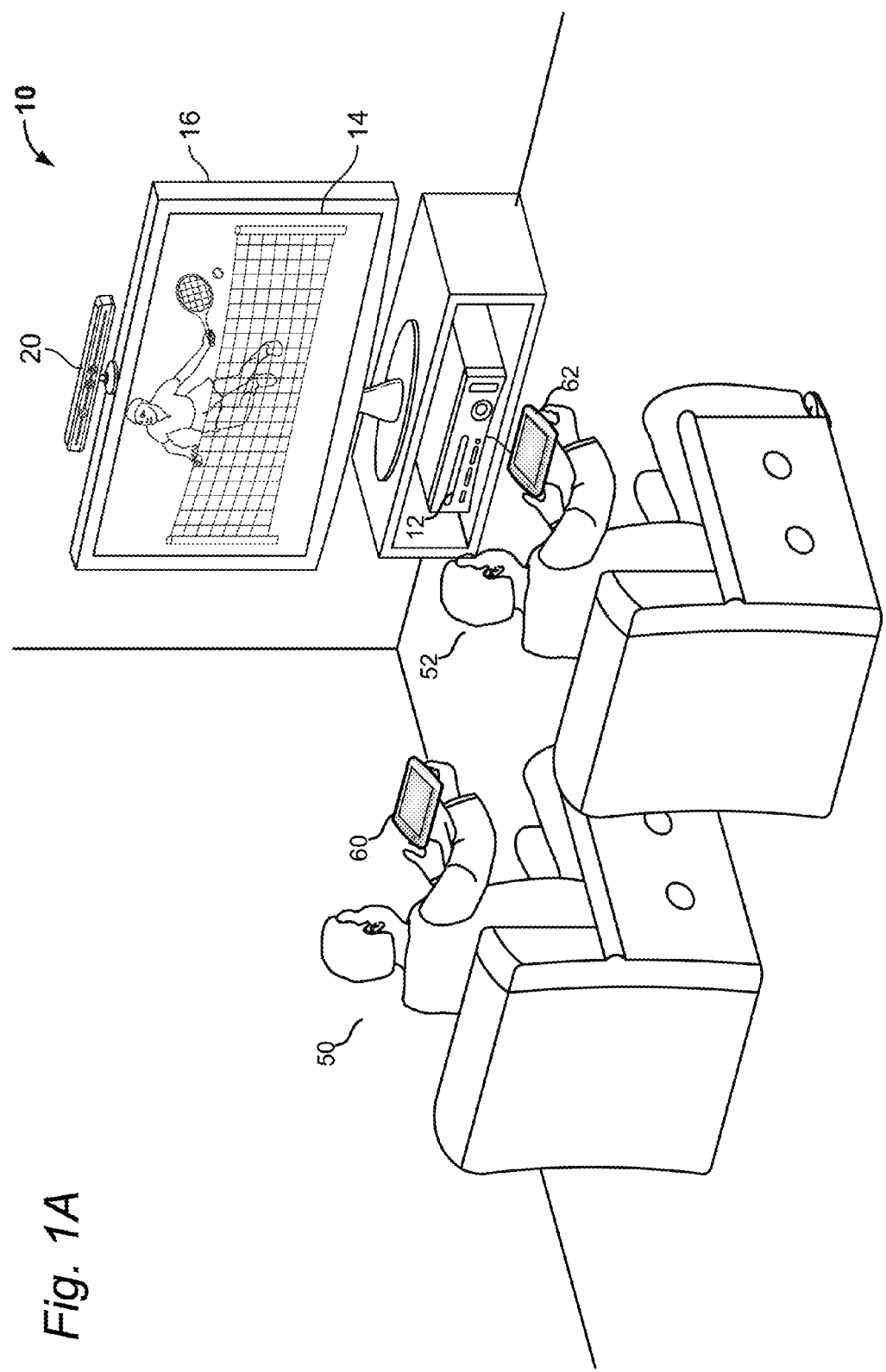
FIG. 1a is a representation of multiple users utilizing the present technology.

Technology is provided for creating a persistent customized social media environment. The customized social media environment consists of one or more persistent customized social media environment definitions. Each persistent customized social media environment definition comprises a set of users who may or may not have a common interest but which may access the environment to share content or an activity. The content or activity may comprise a shared media experience, such as a television program or shared participatory experience, such as an online game. Each user accessing the persistent customized social media environment generally does so from a user device. Multiple users may use a single device or each user may have their own device. The user devices may comprise televisions, tablet computers, personal computers, mobile devices, laptops, or the like, and may be used alone or in conjunction with other devices to complete a sharing experience. Each user may utilize one device or multiple devices simultaneously to participate in the persistent customized social media environment. The persistent customized social media environment definition establishes a user environment which provides social networking services as well as content sharing and allows users who are connected to the persistent customized social media environment definition to experience the content or activity together. When users are not simultaneously connected to the environment, those users who connect to the environment at a later time will receive messages in time with the content once they enter the environment. The technology allows for the presentation of different types of messaging content and social experiences to be gathered into a single user experience environment.

Generally, a user selects to consume content or participate in an activity on using an enabling application. Upon selection of the content, the user is automatically matched to customized social media environment. The environment can be a private environment created by friends or a public one created by a service provider. Alternatively, the user may select a specific environment in which to participate. The environment allows for sharing various forms of communication and content (video, music, links, and the like) amongst the people in the environment, and on the Internet. In addition, the technology allows applications to be launched from within the environment. The technology thus provides a place to socialize and a place to enjoy interactive content (games, voting, and the like), with the social activity synced to the content or activity.

Each public or private environment created is persistent, and content generated in the environment can be tagged with meta-data for future uses of that content, such as links to videos at specific moments of the content.

In one example, users playing a video game create a video and link of how that user completed a complex task or achievement. Subsequently, when the users' friend completes the task, the friend can see videos of how others accomplished this task. Alternatively, if the friend is stuck trying to complete the achievement, the friend can see what others have done. This can be performed automatically, since the environment is aware of the friend's state in the game and the initial user's accomplishment of the task. In another example, a television show may include shared links to online videos of artists performing alternative renditions of music played in the show, or commentary on portions of the show from other users. For a movie, the environment may contain links to previous great plays, bad calls and highlights.

FIG. 1a illustrates a common user scenario which may be employed using the technology described herein. In FIG. 1a, two users 50 and 52 are shown seated in front of a display device 16 on which a piece of shared content 14, in this case a tennis match, is displayed. Each user, 50, 52 has an associated processing device 60, 62. In FIG. 1a, the devices 60, 62 are illustrated as being tablet computers, but may comprise other types of processing devices as discussed herein. Also shown in FIG. 1 is an entertainment system 10 which may comprise a gaming console 12, the display device 16, and a capture device 20, all discussed below with respect to FIGS. 17 through 20.

The environment of FIG. 1a has become more common with the advent of mobile devices. Because of the prevalence of computing devices such as devices 60 and 62 in FIG. 1, the users may be both viewing the shared content 14 while simultaneously interacting with their devices 60, 62 to perform tasks, such as messaging, content sharing, social networking, and the like. In order for the users 50, 52 to interact with each other, and/or users that may not be physically present in the same physical space, a communication mechanism is generally used to communicate. For example, users may join a group chat room or use email to share videos that reference the main content 14.

In accordance with the present technology, a content aware, persistent customized social media service allows each user to enter a persistent customized social media environment, defined by one or more users, suggested by the persistent customized social media service or a defined open persistent customized social media around shared content, to share and experience shared content 14 together and provides communication services to multiple users both in the same physical area and outside of the same physical area.

Figure 1B:
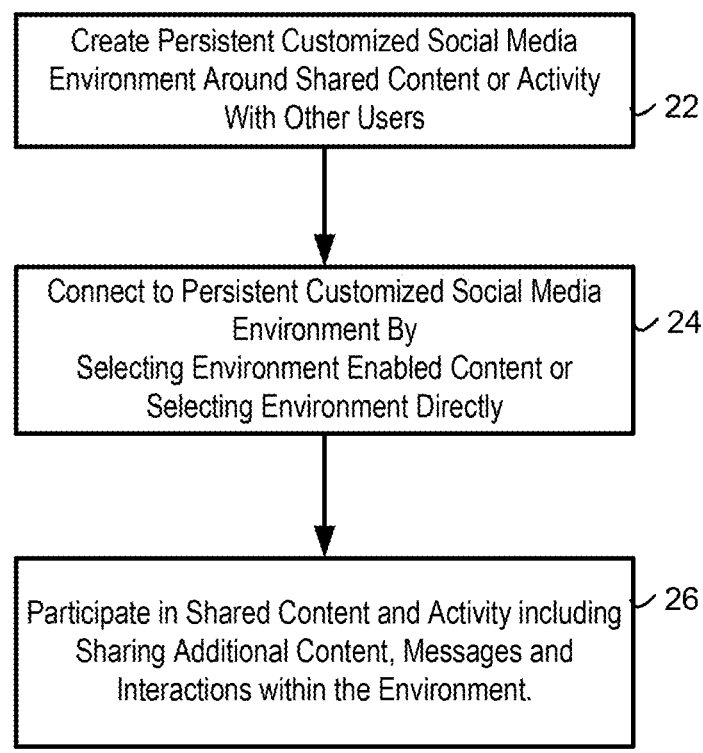
FIG. 1b is a flowchart illustrating a basic embodiment of a method of performing the technology.

FIG. 1b illustrates a general method performed in accordance with the present technology. At 22, a persistent social media environment may be created around an activity or content. The environment may be created by the content provider, a service provider, or users. Environments may be public or private. Users may create a private persistent customized social media environment around a shared content experience or shared activity with specifically selected users. The creating user may select the content and initial users for an environment, and may allow other members of the environment to themselves select to add additional users. Persistent customized social media members then connect to the persistent customized social media at 24 by simply selecting to view environment enabled content or specifically selecting entrance into the environment directly. Once consuming the content or activity in the environment, users can participate in various social activities within the persistent customized social media environment at 26. In one embodiment, users actively connect to a defined persistent customized social media environment and then share the content therein. In another embodiment, users connect to environment enabled content for which the user has not previously participated and the user is matched to an appropriate environment. In yet another embodiment, persistent customized social media may be inferred automatically as people consume content and activities. For example, when a user tunes to a show, the user's companion may be automatically tuned to the persistent customized social media for that piece of content. The user may then participate in the persistent customized social media with the shared content. When participating in the shared content or activity, the persistent customized social media environment participants may share additional content, messages and interactions with other who are connected to the persistent customized social media environment.

Each persistent customized social media environment is persistent once created. It may be re-connected to any of the persistent customized social media members at any time. That is, once a persistent customized social media environment definition is created, the persistent customized social media environment definition is maintained for as long as the persistent customized social media service exists. A user may choose never to visit a persistent customized social media again, however the persistent customized social media environment definition will remain in existence should the user ever wish to return to the persistent customized social media. Persistent customized social media environments may be public or private and allow other members to add content or additional shared experiences to the persistent customized social media environment. Additional features and uses of persistent customized social media environments, and the characteristics thereof, are discussed herein. The persistent customized social media is tightly bound to a piece of content, and a return view to this content will display the content in the persistent customized social media environment. As illustrated below, user interaction with shared content can be exposed outside of the persistent customized social media environment. For example, as shown in FIG. 4b, a user may view data outside of the persistent customized social media environment that indicates, for a content or activity, other users who have visited environments or shared content. This can motivate users to visit this piece of content in the environment.

Figure 2:
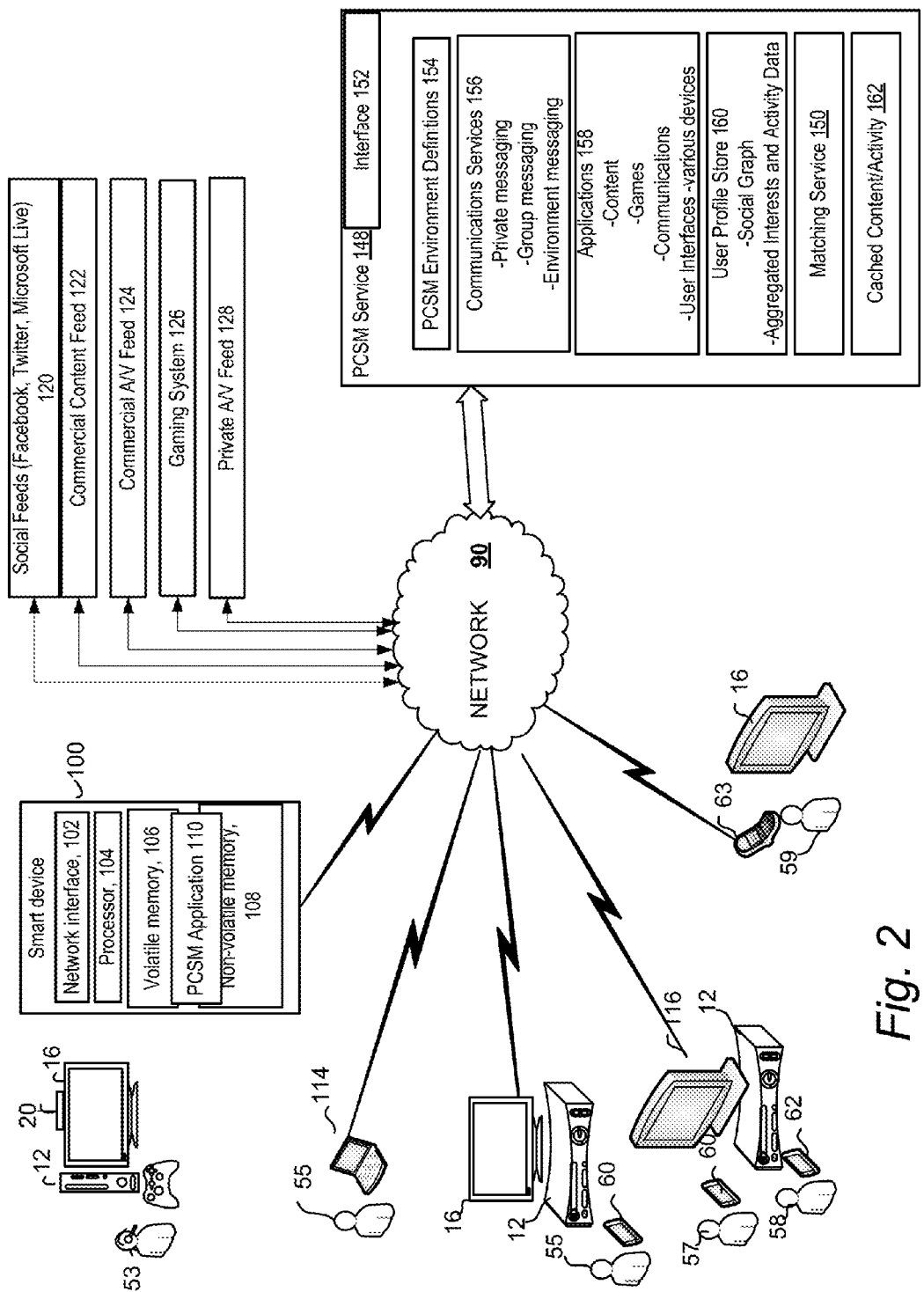
FIG. 2 is a block diagram illustrating a system suitable for employing the present technology.

FIG. 2 is an overview of interacting systems in which the technology presented herein may be practiced. FIG. 2 illustrates various scenarios of users 53, 56, 57, 58, and 59 using various types of devices (12, 16, 20, 60, 62, 114, 116) to access a persistent customized social media service 148 via a network 90. For example, user 53 utilizes a console gaming system 12 in conjunction with a capture device 20 and display 16. User 55 may be utilizing a laptop 114 while user 56 accesses a console processing device 12 and display 16 using a device 102. Users 57 and 58 may each have their own device 60, 62 in a scenario similar to that illustrated with respect to FIG. 1, while user 59 utilizes a mobile phone 63 in conjunction with display 16.

In general, a processing device 100 will include, for example, a network interface 102, a processor 104, volatile memory 106 and non-volatile memory 108. Within the device 100 a persistent customized social media environment application 110 may be provided. The persistent customized social media environments application 110 may be, for example, a dedicated application designed to be executed by the processor 104 of device 100, or may be executed within a virtual machine, such as a web browser using, for example, HTML 5 code. The persistent customized social media application 110 may be provided via network 90 from an application store 158 as part of a persistent customized social media environments service 148.

Network 90 may comprise, for example, a plurality of public and private networks, such as the Internet. Network 90 allows all users 53, 55, 56, 57, 58 and 59 to communicate with each other, with other devices, with the persistent customized social media service 148, and receive content from third-party services 120, 122, 124, 126, 128. Users 53, 55, 56, 57, 58 and 59 may also receive content from separate sources, such as broadcast television via other networks.

A persistent customized social media environments service 148 includes an interface 152 to allow the persistent customized social media environments service 148 to couple to third-party content providers such as social network providers 120, commercial content feed providers 122 (including RSS feeds), commercial audio/video providers 124, gaming service providers 126, and private audio visual feeds. The interface may be coupled to the third party providers via network 90 or other networks. Any number of different services which may be provided via network 90 may be utilized in accordance with the technology provide herein. A persistent customized social media service 148 includes a series of persistent customized social media environment definitions 154, communication services 156, applications 158, a matching service 150, cached content and activities 162 and a user profile store 160

Each persistent customized social media environment definition may include one or more users each of whom may share content or activity, and communicate about the activity in the environment. The users may or may not share one or more common interests, including but not limited to the shared content or activity, which increases the desirability of interaction between the users in the persistent customized social media environment. Persistent customized social media environments may be defined by users, or may be provided by the matching service 150 at the suggestion of the persistent customized social media service 148. Persistent customized social media environments may be defined around the content or activity to be shared. Users can choose to join a persistent customized social media by simply connecting to or "entering" the persistent customized social media experience on a connected device, or by selecting the content which is subject to the persistent customized social media definition. Persistent customized social media environment definitions may also include components to display aspects of the third-party services 120 through 128, and shared content from any of the third-party services or any of the other users' personal shared content. Persistent customized social media environment definitions may be those which are normally recognized as groups in a social networking environment, which may include, for example, "family", "close friends", "social friends", and "work friends". Persistent customized social media environment definitions may also include common interests such as a shared interest in a sport, shared interest in the theatre, or any type of common interest instrument can by shared by users. Matching service 150 can detect the types of the shared interests available from users by accessing the user profile store 160. Matching service 150 can also determine which environment to connect a user to when the user selects to view content without having a specific environment defined or previously used for such content.

A user profile store 160 contains user profiles tracking numerous different types of information regarding a user. Initially, the profile identifies the user and contains a user's log-in information to the persistent customized social media service 148 as well as security credentials associated with each user. The user profile store may also contain a record of the user's social graph and aggregated interest and activity data from the user's network related activities. Activities of a user online can be gathered from accessing the user's use of third-party networks such as social feeds 120 using provided application programming interfaces (APIs) from the third-party interfaces, or for activity tracked by the persistent customized social media environments application 110 on a device. Such activities can also be input via, for example, gaming services 126. For example, a service such as X-Box Live® provides a record of a user's activity playing games on the X-Box Live® service. This can be stored in the user's profile store. Activities on web sites such as YouTube or Twitter can also be fed into the user profile store, and information in these activities culled to determine frequent interests of the user.

Communications services 156 allow the user to participate in private, group and environment-wide messaging. In private messaging, a user can direct a message to an individual user within the persistent customized social media which is not seen by other persistent customized social media members. Similarly, in group messaging, a user can direct a message to a sub-group within the persistent customized social media. Persistent customized social media messaging allows users to direct messages to the entire membership of the environment, or to provide a "shout" over the user's indicator within the persistent customized social media. A shout can be considered a permanent status or tag line for the user which is displayed whenever a representation of the user is provided in the persistent customized social media.

Applications 158 can include content such an audio/visual content, written content or other types of consumable content, games, communications between users, and user interfaces from various devices. In one embodiment, a persistent customized social media environments application is stored in the application store 158 and retrieved by the user on the device 100 when the user desires to participate in a persistent customized social media environment. The application can be a dedicated application specific to a user device, or be programmed to operate in a web browser using standard web programming techniques. Likewise, web applications may be stored in the application store 158, and launched by a launcher in the persistent customized social media environments application 110. As such, application 110 may be as simple as a dedicated shortcut to load a mobile application from the application store 158. Any type of various architecture which is currently utilized to provide applications to devices 100 can be utilized in accordance with the present technology. When used in conjunction with shared content, for example, applications can comprise games related to the content. For example, the games may be social games accompanying sporting events. Since applications launching capability is provided in the persistent customized social media environment, the applications may be launched seamlessly from within the interface, and may then create a separate interface or be integrated in a window or display within the persistent customized social media environment interface.

Cached content/activity 162 includes content shared in environments as well as meta-data, links and other sharing activity which occurs around the content in the persistent customized social media environments. As users interact with others and the content, information concerning the sharing activity of the users may be stored for later consumption by other users and use in implementing various features described herein, such as linking to different types of media or providing comments on the content, as described above.

Social feeds 120 can include feeds from services such as Facebook®, Twitter®, Microsoft Live®, and the like. A commercial content feed 122 may include information culled from various commercial news sources, or content aggregators. A commercial audio/video feed may comprise network-based feeds which are communicated via network 90 such as YouTube®, Hulu®, or audio/visual sources broadcast networks, as well as any of the video feed which may be transmitted via network 90. Commercial content feed 122 may include various types of media, including audio/video, text and image information. Gaming services 126 may include games and activities from, for example, the aforementioned X-Box Live® service, or the Sony PlayStation Network®. Private audio/video feeds 128 may provide content which is shared by users via one or more of the content sharing services available via the Internet.

FIG. 3 represents a typical use situation for involvement in a persistent customized social media environment. FIG. 3 shows a display 16, such as display 16 shown in FIG. 1 in a device, such as device 60 illustrated in FIG. 1. In FIG. 3, the devices are in the same physical environment and the view of both screens is from the view of a user operating device 60. Shown in FIG. 3 on the device 60 is an example of the user interface for a persistent customized social media environment. On display 16, an event 14A shows a soccer game in action. A viewer of content 14A on screen 16 may be holding the processing device 60 and engaged in a persistent customized social media environment as displayed on device 60.

It will be understood that the examples of the persistent customized social media environment user interface displayed herein are exemplary only and can vary substantially with respect to the functionality described herein. Any number of variations on the functionality described herein and the user interface can be provided. In addition, as noted herein, while FIG. 3 shows two devices used simultaneously by a single user, a user may participate in the persistent customized social media environment with a single device such as device 60 alone or display 16 alone (with an interface such as that shown in FIG. 12).

For users viewing a soccer game, the user interface 300 may include, for example, an area 302 with a representation of all the users in a persistent customized social media environment at any given time. Area 302 shows a list of avatars representing individuals who are connected to the persistent customized social media environment during the performance of the soccer game illustrated on screen 16. An area 320 is a set of tile allowing the user to select connections to other persistent customized social media environments which are available to a user of device 60. Each of the tiles shown at area 320 represents a different persistent customized social media. The highlighting of the "my family" persistent customized social media environment shows that the user interface is now connected to and engaged with the "my family" environment (which may comprise users in the person's family). When connected to the "my family" persistent customized social media environment, the avatars shown in area 302 are representations of members of the "my family" environment. The highlighting of the "my family" environment indicates that the present representations on the screen represent the activities of the users within that environment. Both public and private persistent customized social media environments are shown in area 320. For example, the "my family" environment represents a private, family environment, while the Seahawks Football persistent customized social media environment represents a public persistent customized social media shared by Seattle Seahawks football fans. However, a user may be connected to multiple persistent customized social media environments at one time, and an indicator (347—FIG. 4) may provide a notification of activity in another persistent customized social media environment which may draw the user's attention away from a currently viewed persistent customized social media environment to a different environment.

Additional elements of the soccer game persistent customized social media environment user interface 300 include a persistent customized social media activity queue 330, an avatar 375 representing the user of the interface 300, messaging group indicators for "all users" 340 and a subset 345 of a user. A new persistent customized social media button 310 and an add persistent customized social media button 312 are also illustrated. Application launcher icons 338 and 339 may also be included to launch environment specific applications. For example, the "my football friends" environment may include applications that are specific to football users or which are specifically selected by the users of the football environment, such as a fantasy football league.

In a shared soccer game persistent customized social media environment interface, messages or content expressed by other users is illustrated by avatars 303 and 305. Any of the users represented by avatars 302 may express information to the persistent customized social media environment or a subgroup of members in a persistent customized social media environment by entering text in any interface and taking user interface actions to display the text to members of the persistent customized social media environment. In this example, a user avatar 303 appears excited about the fact that a goal was just scored and a bubble 304 appears relating the user's message to the entire group. In addition, because the user's message is one which in a real world environment might lend itself to expression, the avatar can be animated to show a two thumbs up gesture or any other similar gesture which is appropriate to the message 304 which is displayed. A second user 305 displays a second message 306 to the group. Because the message 306 is related to the first user's message at 304, both users can be displayed simultaneously.

In one embodiment, device 60 is a touchscreen interface and each of the elements thereon is selectable by a user via touchscreen action. In alternative embodiments, any of the elements can be selected by alternative means which are generally known for interacting with user interface such as using a mouse or other device.

While FIG. 3 illustrates an interface which may appear for a shared soccer game experience, FIG. 4 illustrates a general representation of a user interface 110. Each user interface may comprise a series of organized applications or components which provide different functionality. Examples include audiovisual players, lists, selection tiles to access additional features (or persistent customized social media environments), selectable icons and avatars, illustrations and animations. Each environment definition includes multiple components which may be included in the user interface 300.

Figure 4A:
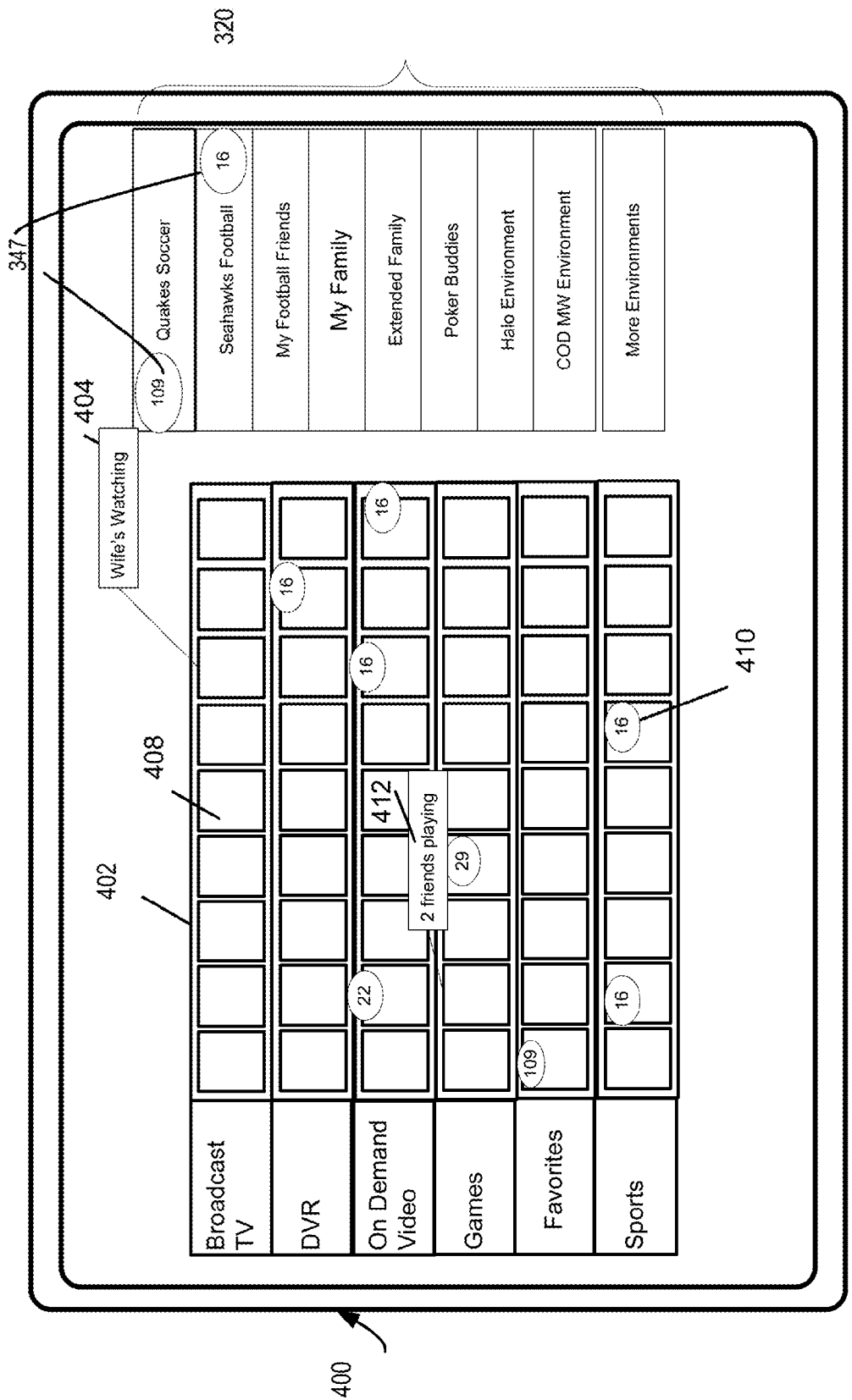
FIGS. 4 through 11 are various illustrations of input screens for user actions illustrating the technology presented herein.
Figure 4B:
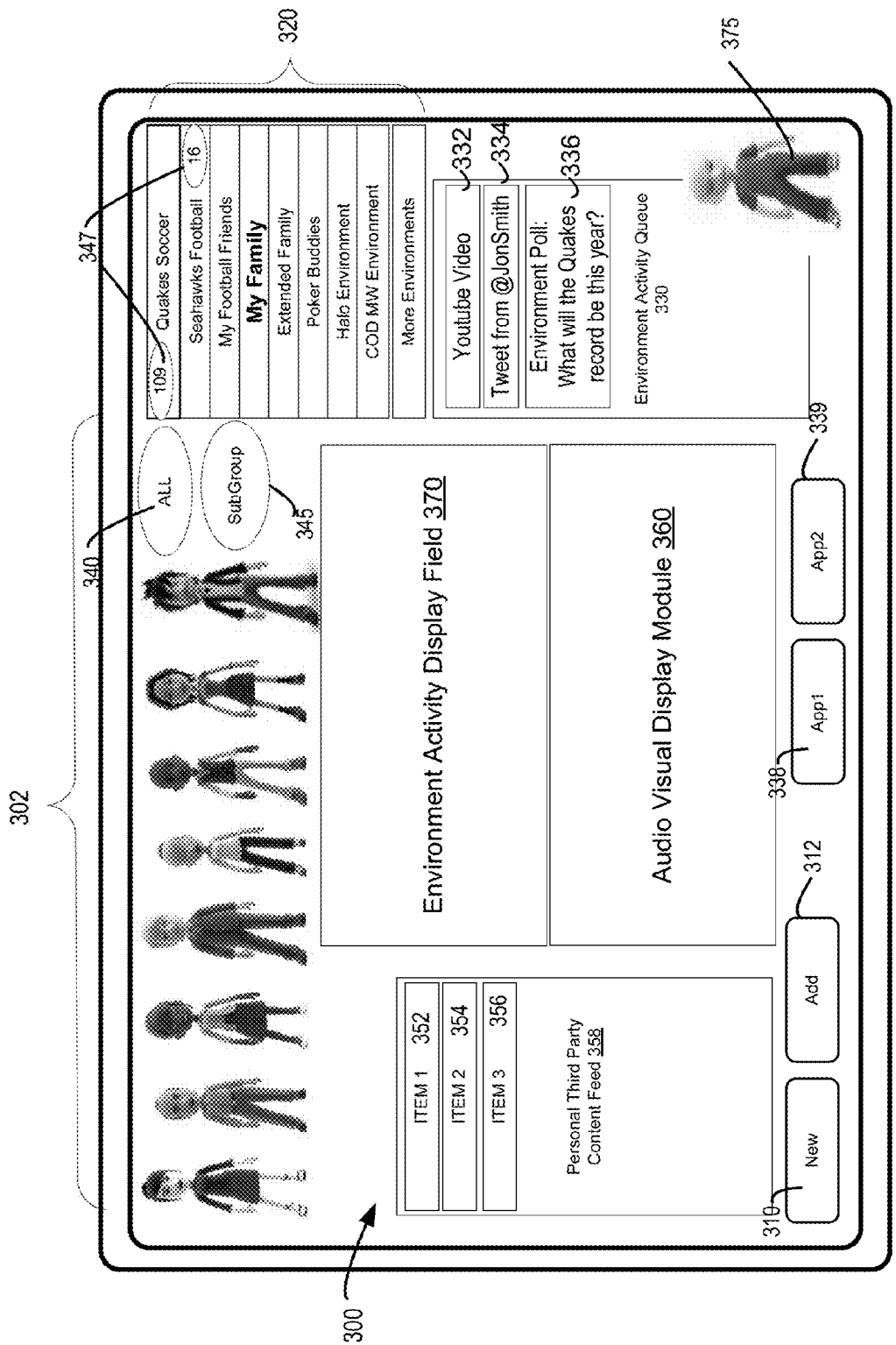

FIG. 4a illustrates a content selection interface which may be provided prior to a user entering an environment or when a user desires to switch content after entering a persistent customized social media environment. The interface 400 allows a user to select content and provides an indication of what other users may be participating in content at a given time. The interface of FIG. 4A is merely exemplary of launch interface pad that shows available or recommended persistent customized social media environments.

An interface 400 includes a selection grid 402 organized in categories of different content, and having a plurality of icons 408 which indicate the type of content which may be selected for consumption using the technology. A user selecting an icon in the interface in any of a number of known manners will tune the content to the user's viewing device. A persistent customized social media indicator area 320 may comprise selectable tiles show other persistent customized social media environments which a user may select to enter. Indicators or notifications 347, 404, 410, 412 provide information on other users, both public users and friends, who may be consuming content in the selection interface. For example, notifications 347, 410, may simply indicate the number of users viewing particular content at that time. Indicator 412 shows that two of the user's friends are playing a game, which may lead the user to join them. Indictor 404 shows that the user's wife is currently watching a broadcast television program. Once the users selects content to consume from grid 402 or a specific environment from area 320, an environment interface may be provided.

As illustrated in FIG. 4b, a friend's area 302 is an indicator of all the persistent customized social media members connected to the current persistent customized social media environment. In a private environment, there may be a defined relationship for users in the "friends" area. In a "public" environment, any user connected to the persistent customized social media may be displayed in the "friends" area. In one embodiment, the persistent customized social media participants are represented as avatars as previously discussed. Any number of alternative representations of persistent customized social media members whether currently present or connected, active or idle, or unconnected, may be used in accordance with the present technology. If a large number of users need to be shown, a selection algorithm such as connection frequency may be used by the persistent customized social media service to determine which persistent customized social media selections to present in area 302, and an indicator allowing the user to display additional persistent customized social media members may be provided. Similarly, the persistent customized social media indicator area 320 may comprise selectable tiles show other persistent customized social media environments which a user may select to enter. If a large number of persistent customized social media environments need to be shown, a selection algorithm such as connection frequency may be used by the persistent customized social media service to determine which persistent customized social media environment selections to present in area 320, and an indicator allowing the user to display additional persistent customized social media environments may be provided. One or more notifications 347 may be associated with persistent customized social media identifiers. The notifications 347 may provide indications of activity occurring in other persistent customized social media environments and be associated with such persistent customized social media environments in area 320. This may draw the user's attention away from the persistent customized social media that the user is currently in, "my family", as indicated by the highlighting of the "my family" tile.

A user interface for the persistent customized social media environment may include a personal third-party content feed 358, a third-party audio/video feed 360, and a persistent customized social media activity queue 330. Note that any of these areas may be expanded to a greater area than that illustrated in FIG. 4B, or may be eliminated or modified in various embodiments. A personal third-party content feed 358 may include items 352, 354, and 356, which are notifications or messages from other content which may be provided by third-party content providers but which are unique and associated specifically with the user (375) of the interface 100. For example, if a user has a Twitter feed, a user follows a certain set of users in that feed, and those messages would appear along with messages from other services in the personal third-party content feed in the form of items in the feed 358. Note that the twitter feed may be re-synced to the original timeline of the content. For example, if watching the Super Bowl two days after it aired, Twitter feeds from that point in the game ought to show up. Similarly, a third-party audio/visual feed 360 may be provided in a component and include services or content to which only user 375 is subscribed. As will be discussed below, a user can also choose to share any one or more private or personal elements with other members of the persistent customized social media by using appropriate gestures or user interface commands. For example, a user can view messages from other sites, subscribe to media and information feeds, and publish data to all users in the environment or subsets of users in the environment. The persistent customized social media activity queue 330 shows items which are common to all members of the current persistent customized social media environment and which will be shared next in the environment. In the example shown in FIG. 4b, the items represented are a YouTube® video 332, a Tweet® 334 and a persistent customized social media poll 336. Each of these items will be displayed in succession in the environment shown in FIG. 4b.

FIG. 4b illustrates a persistent customized social media display area 370 where each of the items in the persistent customized social media activity queue may be displayed. For example, when the YouTube video 332 is displayed, the persistent customized social media display 370 illustrates an interface for displaying the YouTube video. The user may select to play the video or can choose to delete the video and if enough people decide to delete the video, the video may be removed from the persistent customized social media altogether. When the persistent customized social media poll 336 rises to the top of the persistent customized social media activity queue 330, the poll interface will be displayed in the persistent customized social media display area 370. As noted above, both the personal third-party content feed 356 and the persistent customized social media display 370 and third-party audio/visual feed 360 can be replaced by other elements such as an icon or Avatar of another user, or, as illustrated below, by keyboard to allow user input the display 100. As illustrated below, other components, such as a keyboard, or larger animated avatars, may occupy the display at any given point in time.

Once in the environment, a user may perform any number of different activities.

Figure 5:
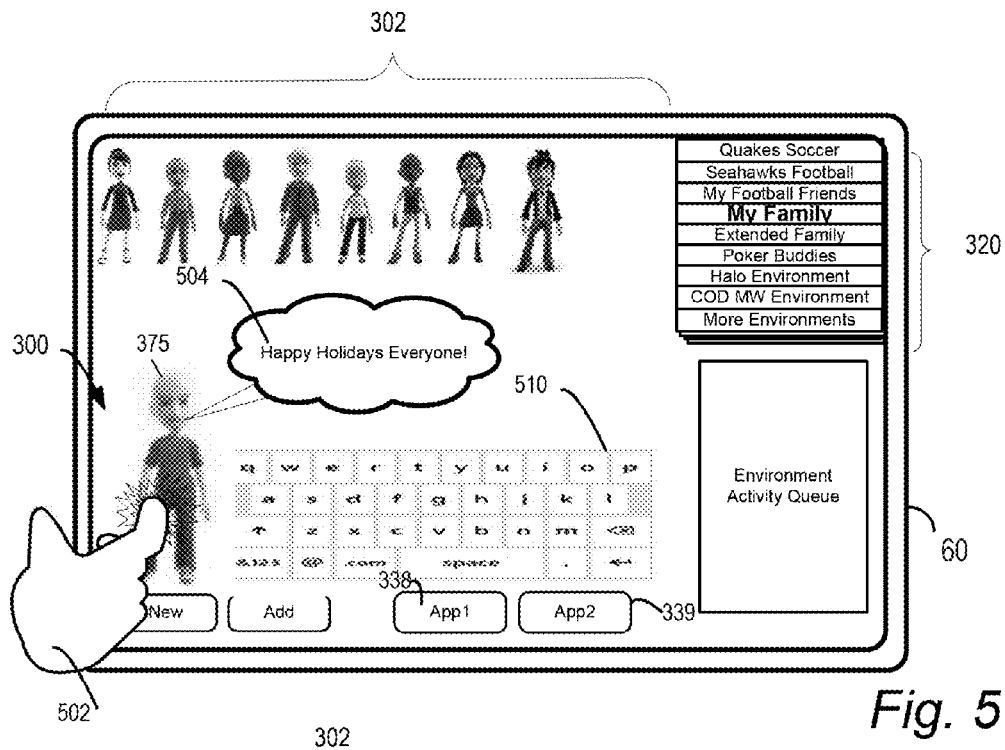

FIGS. 5 through 10 illustrate various user interface actions that illustrate the user activities within a persistent customized social media environment. FIG. 5 illustrates a user action which may be implemented when a user wishes to provide a status update or "shout". A shout update represents a semi-permanent message which is associated with the user's representation, such as an avatar, within a user interface 300. As indicated in FIG. 5, in one embodiment, a user may double tap at 502 a user's own avatar icon 375 to indicate that a "shout" message follows. As a result of this indication to the user interface, an onscreen keyboard 510 will be displayed, and the user may tap a message, in this case "happy holidays everyone!" 504 which displayed in a bubble 504 adjacent to the user's avatar 502.

Figure 6:
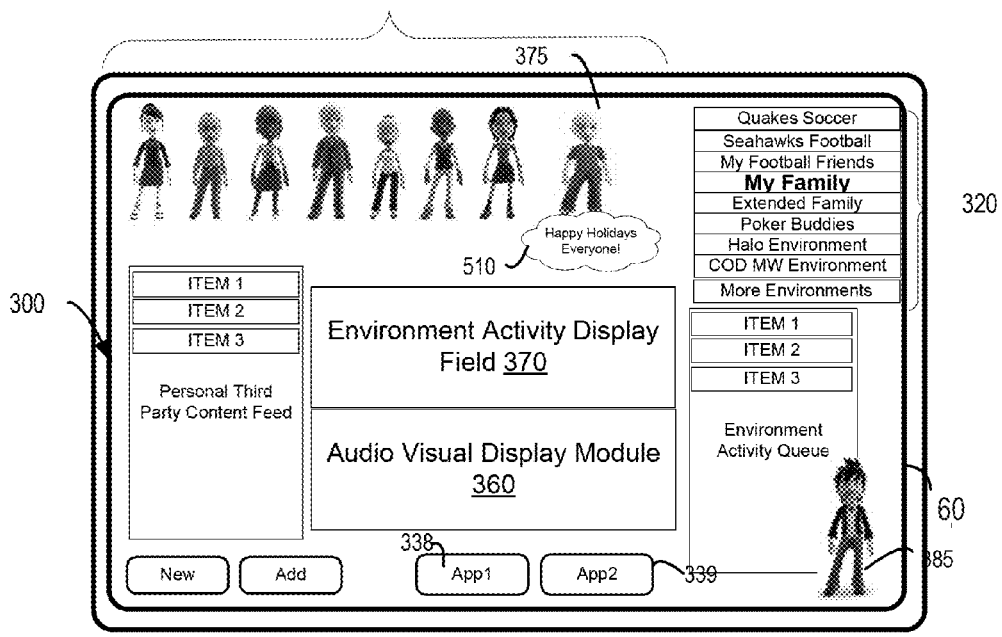

FIG. 6 represents the display of a user's "shout" to other users in the current persistent customized social media environment definition. FIG. 6 is a view of the environment from user 385's screen. As illustrated in FIG. 6, the user's avatar 375 will have associated with it a pop-up cloud or icon with the user's message displayed therein. It will be recognized that any number of different types of "shouts" or messages or user status messages and representations of the message may be utilized in accordance with the present technology. It'll be further recognized that the particular gestures or interface movements displayed with respect to FIG. 5 may be varied and any number of different types of gestures or interface interactions may be utilized to indicate a "shout" or status update.

Figure 7:
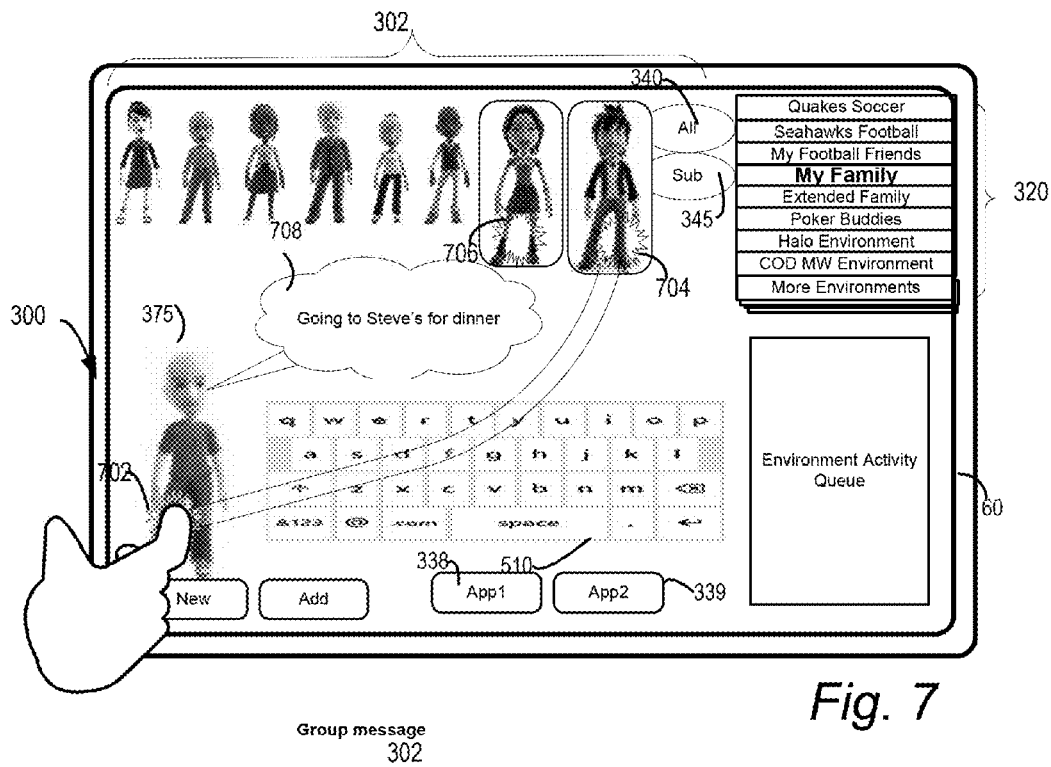

FIG. 7 illustrates interaction with the user interface to send a group message. At 702, a user may tap their own icon 375 which provides an onscreen keyboard 510. After entering text into the onscreen keyboard, (in this case "going to Steve's for dinner") the user may single tap other users' avatars at 704, 706 to indicate the message is to be directed to these two users. Alternatively, a user can select the all button 340 to direct the message to the entire persistent customized social media environment or button 345 to a defined sub-set or sub group of the persistent customized social media environment. On the second user's screen, the user will see a message bubble 708 which indicates the user's outgoing message, "going to Steve's for dinner" which is directed to the users represented by avatars 704 and 706.

Figure 8:
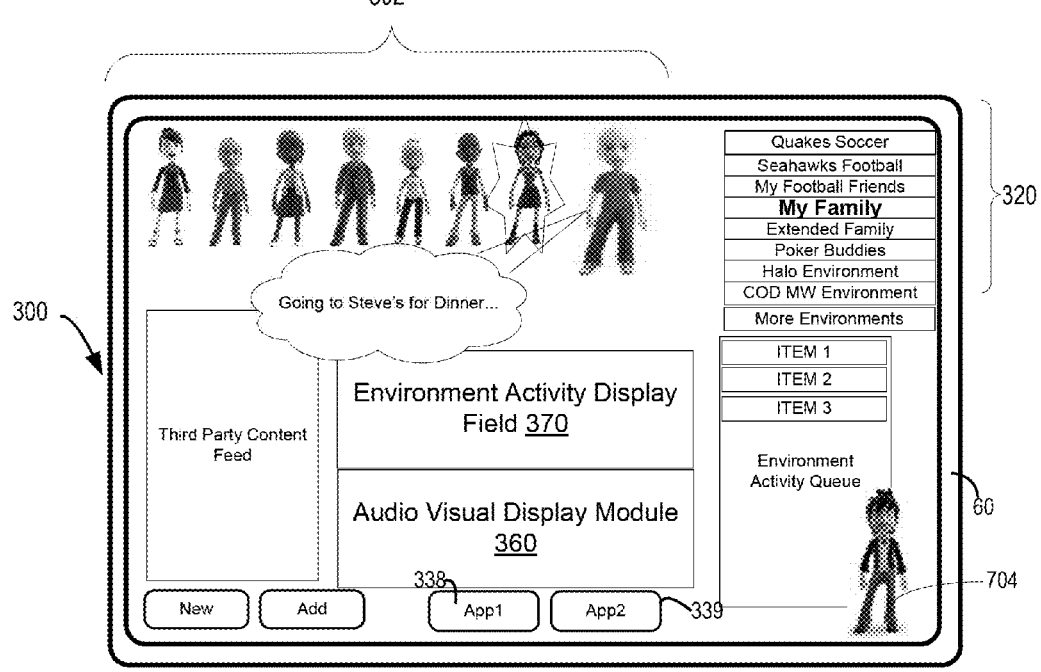

FIG. 8 illustrates the receipt of the private message by the user 704. As illustrated therein, the sending user's avatar 375 is highlighted with a bubble 802 having the incoming message presented therein. Likewise, because this is a group message, user 706 has a highlighted avatar indicating that the message was sent to both users. If the message is a private message, an alternative indication may be shown in the user's screen including a different highlighting of the inbound user of avatar of the sending user's avatar, or a notation else around the screen that the message is a private message.

Figure 9A:
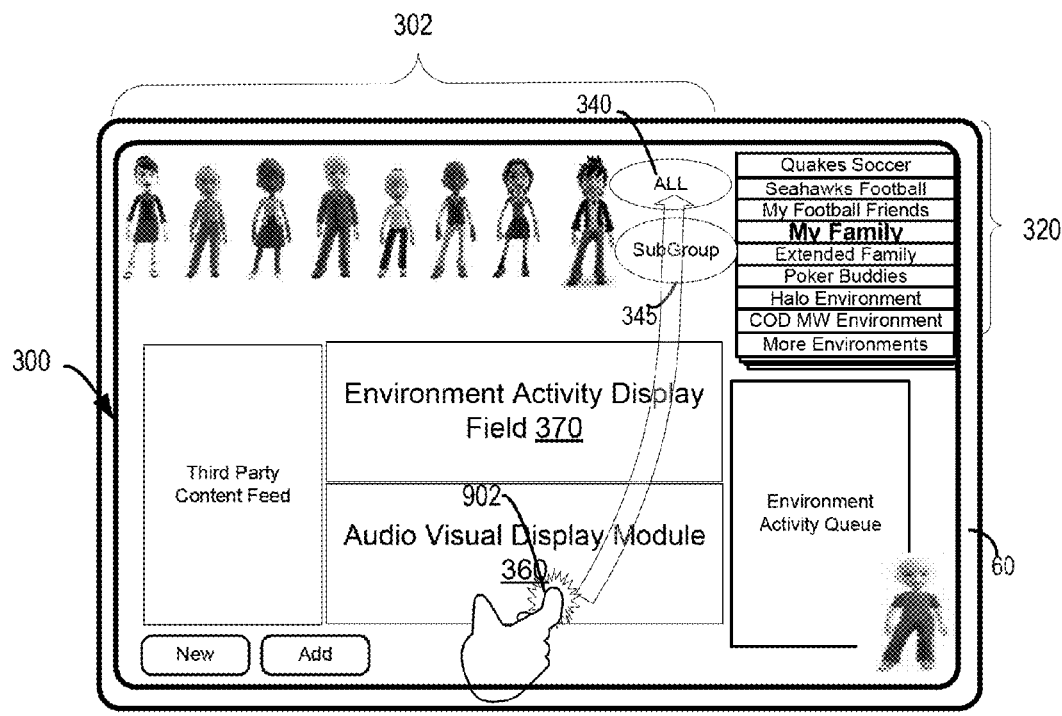
Figure 9B:
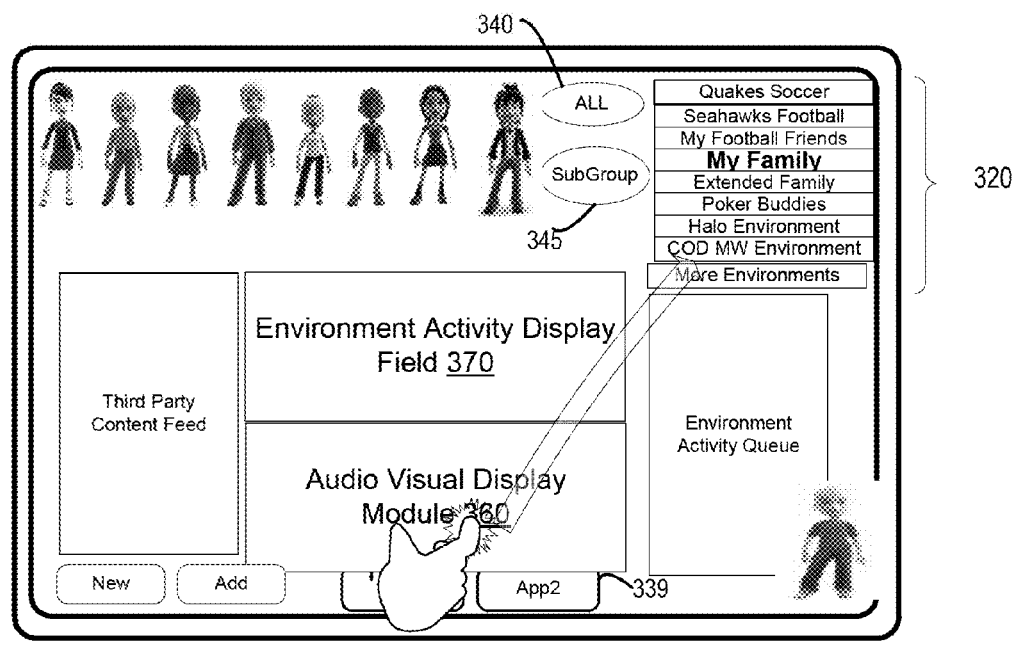
Figure 9C:
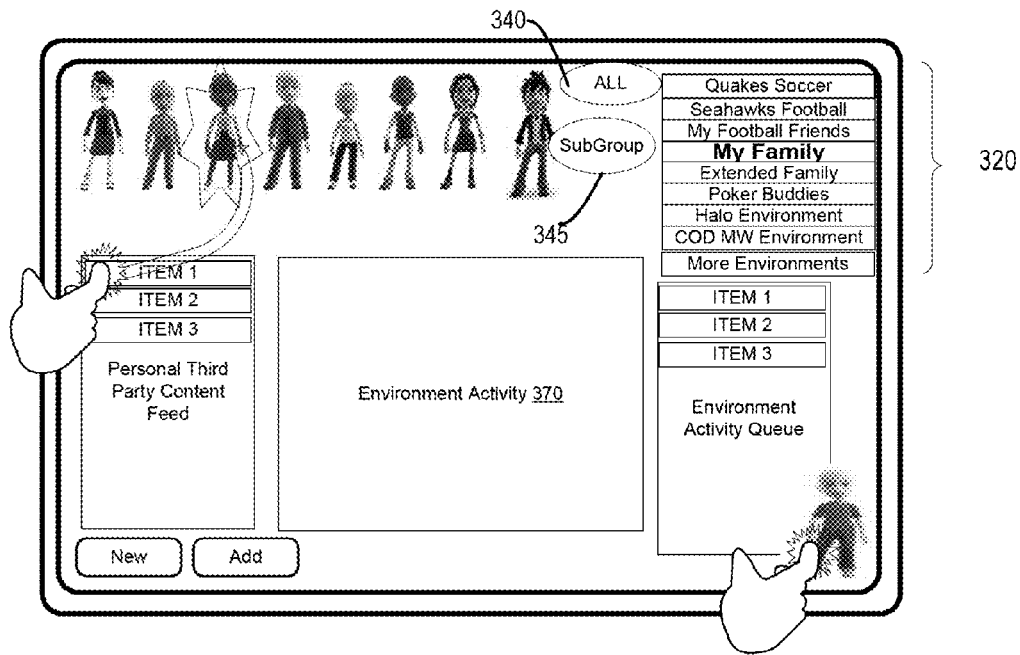

FIGS. 9a-9c illustrate an embodiment of user interactions to add additional content from third-party feeds into a currently connected persistent customized social media environment. At 902, the viewing user connected to a persistent customized social media environment can tap on third-party content displayed in the user's third-party window 360 and tap the all button 340 to add the information or share the information with all users in the persistent customized social media. Alternatively, as shown in FIG. 9b, to share content with users in other persistent customized social media environments, the user can select or tap the third party-content at 360 and tap any one of the tiles in region 320 to share that content with any other group or persistent customized social media. Alternatively, as shown in FIG. 9C, a user can tap content from their person feed and tap individual users represented by avatars in region 302 can be selected, or a group of users can be selected in order to share third-party content from the third-party content feed or the third-party audio/visual display.

Figure 10:
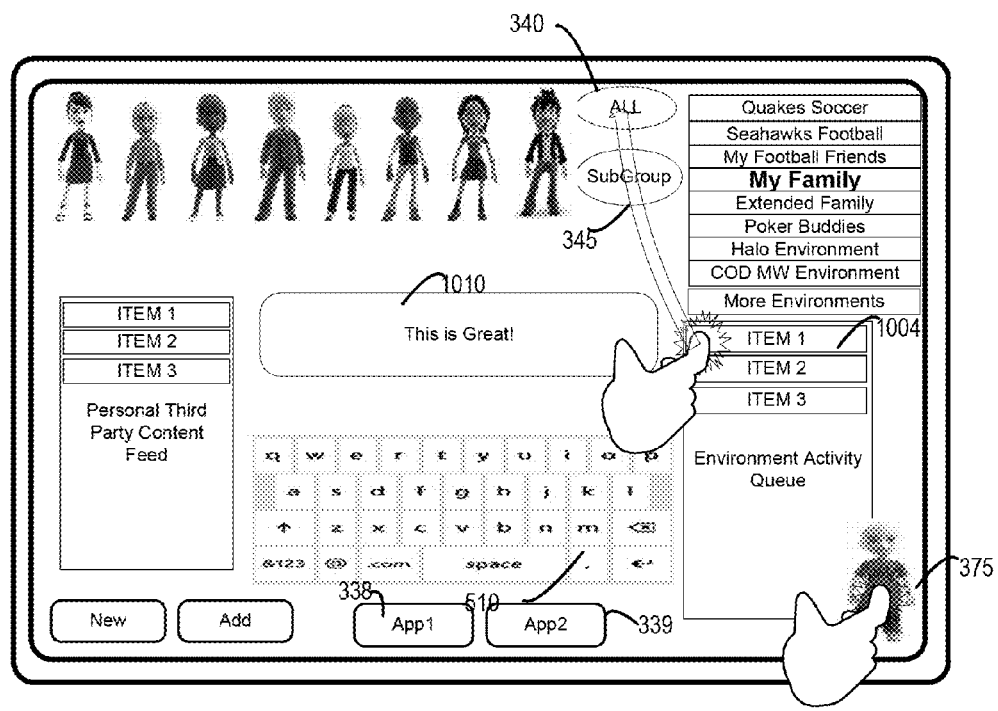

FIG. 10 illustrates interface actions which may be utilized to comment on items which are presented in a persistent customized social media activity queue. As illustrated in FIG. 10, a user first taps on their own avatar representation at 375, then taps on the item at 1004 that the user wishes to comment on. Finally, the user selects the all button 340. At this point, a keyboard 510 will be displayed allowing the user to add a message 1010 in a message display and when the user selects to enter or re-selects the all button 340, for example, the message would be displayed to all the users in conjunction with the item being presented. This presentation can take persistent customized social media in a manner similar to that shown above with respect to FIG. 3, or any alternative type of indication associated with the message. It should be noted that the type of notification of a comment made with respect to FIG. 10 can be adapted to be suitable for the particular message being displayed.

Figure 11:
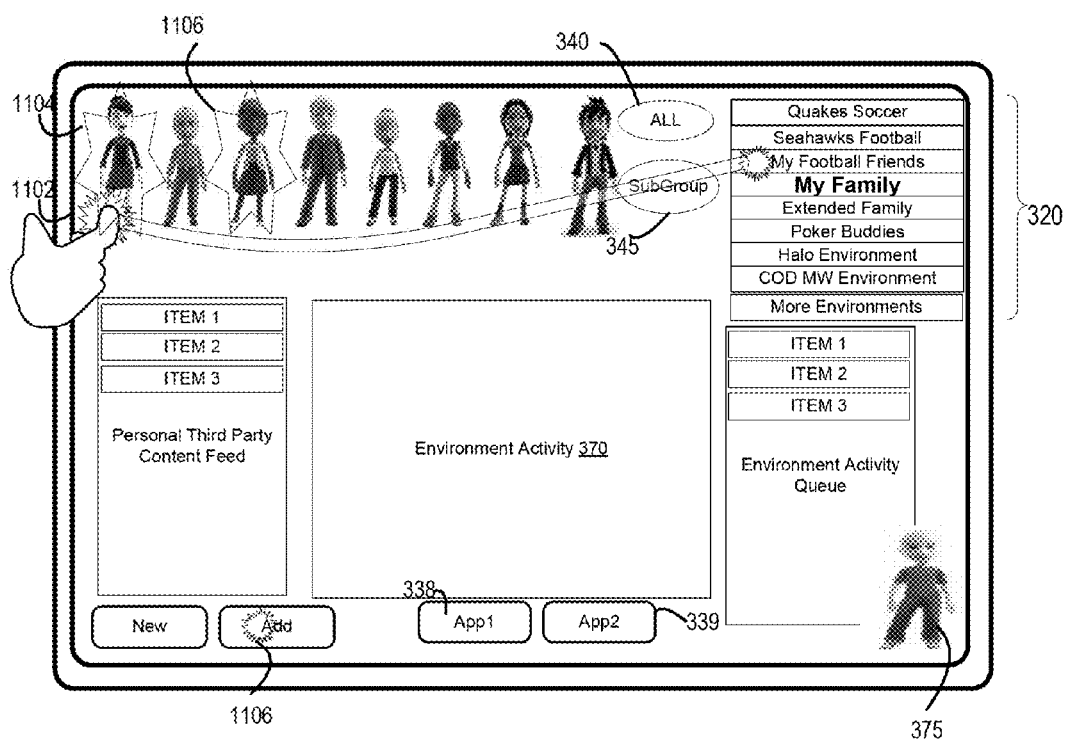

FIG. 11 illustrates the suggestion of additional users for addition the persistent customized social media environment. A current persistent customized social media (highlighted) or a new persistent customized social media environment is represented by tiles in area 320. At 1102, a user can tap and highlight a user avatar 1104 and a second user avatar 1106 and then tap the group "my football friends" tile indicating the two users are football fans and should be added to the persistent customized social media environment definition for "my football friends." It will be recognized that any number of different types of gestures can be used to utilize or add users to the group. A user may first touch the user add button at 1107 to add the users to a particular definition.

It will be recognized that the embodiments shown in FIGS. 3-12 are merely exemplary of the types of interfaces and functions one may perform. Numerous alternative interfaces may be provided.

Figure 12:
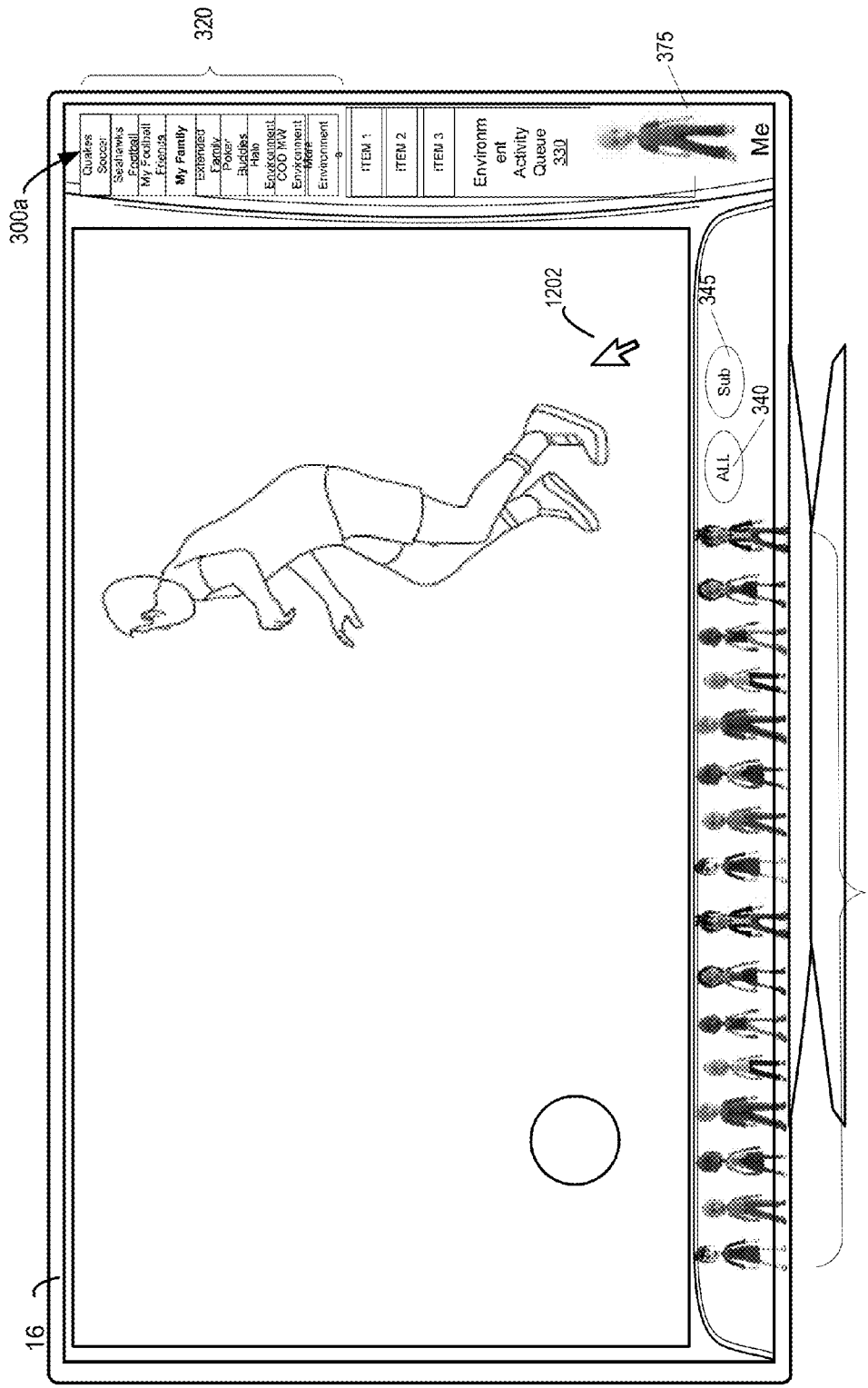
FIG. 12 is a display indicating an alternative user interface suitable for use in accordance with the technology presented herein.

FIG. 12 illustrates the interface 300a provided on a full-sized display 16. In this embodiment, some of the usable display area of the display 16 is occupied by interface 300a. As indicated therein, the persistent customized social media environment tiles 320 are provided on one side of a display area 300. User avatars 302 are provided at the bottom of the screen. Nevertheless, each of the aforementioned elements for enabling a display in a persistent customized social media environment is represented on display 16. An alternative controller means, such as a remote control, a separate device, or a game controller, can be utilized to move a cursor 1202 around the screen to select elements on the screen.

Figure 13:
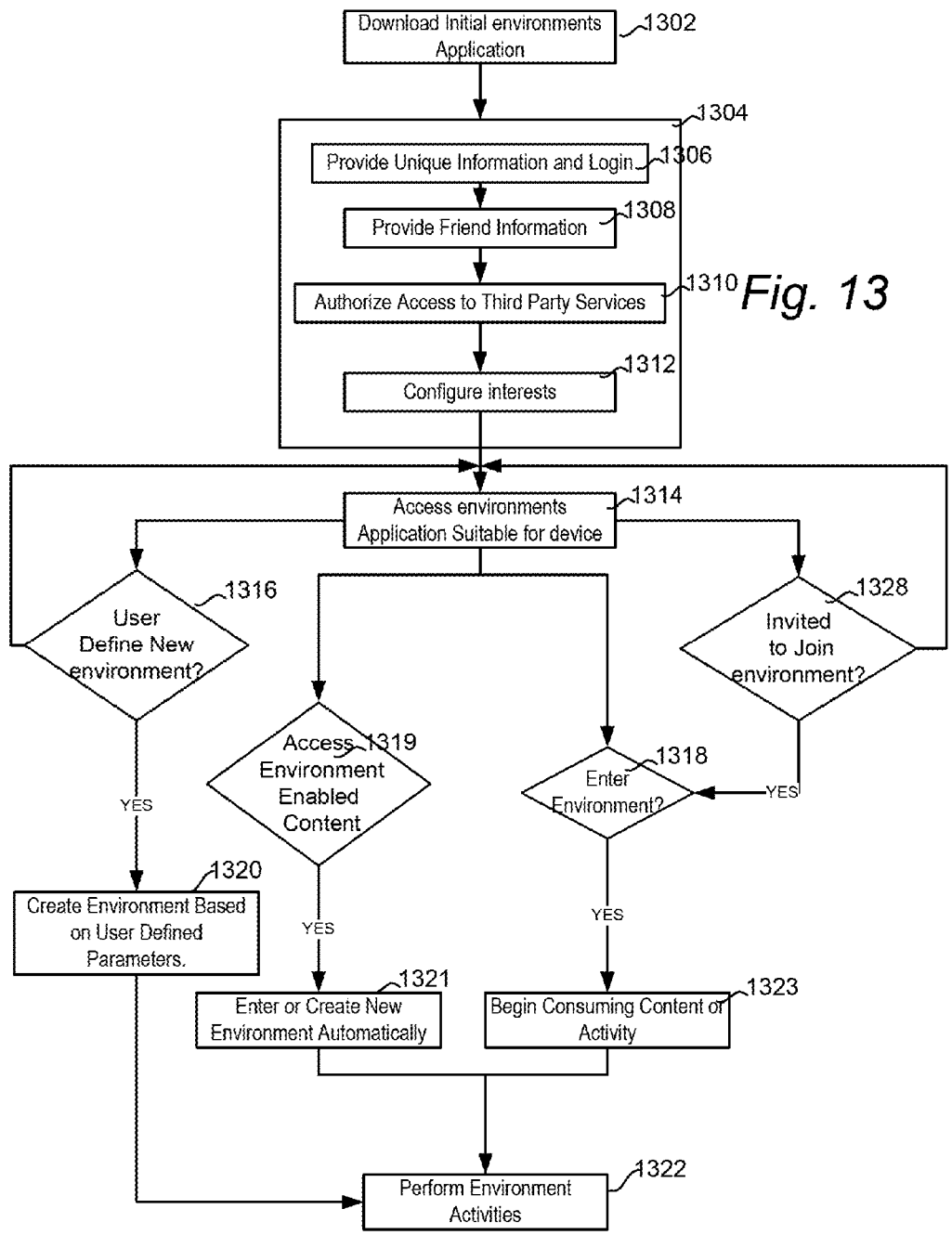
FIG. 13 is a flow chart illustrating a method which may be performed on a user device in accordance with the technology presented herein.

FIG. 13 illustrates a method performed by a user on a device for interacting with a persistent customized social media environments environment. FIG. 13 illustrates a more detailed method than the general method of FIG. 1B. Initially, at 1302, a user may be required to download a persistent customized social media environments application. As noted above, this step is optional as a persistent customized social media environments application may already be installed on a user's device, or the application may be provided via a web server and downloaded to the user's device for execution in a virtual machine such as a web browser. If the user has not previously registered with the persistent customized social media of service, the user registers with the service at 1304. This may comprise the steps of providing information such as a user identifier and log-in information at 1306, identifying social network friends at 1308 by, for example explicitly identifying other users as friends, authorizing access to third party services, such as social networks at 1310, by providing credentials to log in to third party services at 1310, and explicitly configuring interests at 1312. For example, if the user has customized media accounts at different media presentations services, such as Twitter®, the user may provide the user's credentials to those services so that information available from those third-party APIs may be utilized in the present system.

At 1314, the user will access a persistent customized social media environments application suitable for the user's device. The application may include one or more modules that allow the user to interact with various persistent customized social media environments. Accessing the application may be as straightforward as selecting a launch icon in the user interface of the device the user chooses to access the persistent customized social media environment with. Once the application is launched, user interface similar to that presented above with respect to FIGS. 3 through 12 may be shown. Alternatively, another user interface may comprise a basic content selection interface (such as FIG. 4A), with the persistent customized social media activity elements not appearing until the user accesses the content. Once a persistent customized social media application is engaged at 1314, a user can then create a new persistent customized social media at 1316, choose to enter an existing persistent customized social media at 1318, or select persistent customized social media enabled content having, for example, a public persistent customized social media at 1319. As mentioned above, the persistent customized social media may be automatically created when viewing a piece of content (e.g. public to my friends). The user may also respond to an invitation to join a persistent customized social media environment created by someone else at 1328 by simply entering the environment or viewing the content.

At 1319, once a user accesses environment enabled content, the user is automatically entered into the persistent customized social media environment at 1321. Alternatively, a user may select a persistent customized social media environment at 1318 by selecting an interface tile in area 320 of the interface 300/300a, after which the user enters the environment and begins consuming content at 1323. Once a user enters an environment, the user is connected to the members in the persistent customized social media environment and experiences the shared content or activity as presented above. In some embodiments, a user accessing content common to multiple environments that the user had engaged with may allow the user access to the multiple persistent customized social media environments associated with the content. For example, a user viewing a football game may be engaged with two environments, one with my "football friends" and one with "Seahawks football." Once connected to the environment, the user can perform persistent customized social media activities 1322 such as those described above. Additional discussion of persistent customized social media activities occurs below with respect to FIG. 16. Once connected to the persistent customized social media at 1318, the user has options to create a new persistent customized social media at 1316 and if the user chooses to do so, at 1320, new persistent customized social media environments can be created based on user-defined parameters. Creating a new persistent customized social media environment is provided below. In addition, users may be invited to join additional persistent customized social media environments at 1328. If the user chooses to join additional persistent customized social media environments the user may at 1318 choose to enter the new. The user may be "present" in any number of different persistent customized social media environments at once. In this context, multiple environment screens may be shown showing the user connected to an individual persistent customized social media environment definition. Alternatively, notifications from individual persistent customized social media environments may be provided in a different manner when a user is "connected" to a different persistent customized social media environment.

Figure 14:
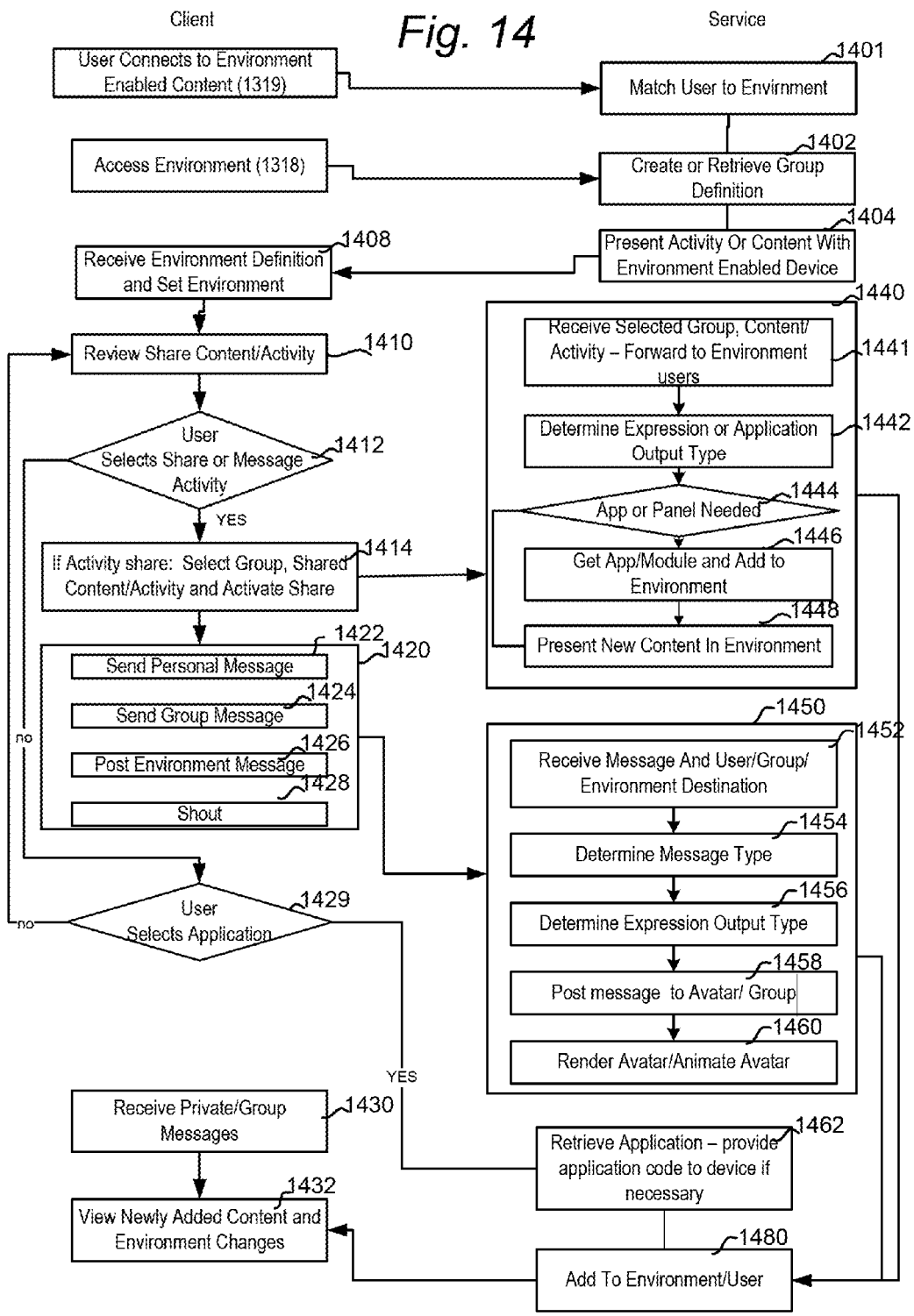
FIG. 14 is a flow chart illustrating the interaction between a user device and a service provider in accordance with the present technology.

FIG. 14 shows a flow chart illustrating the interaction between a client (or device) and a persistent customized social media service when the user is interacting with a persistent customized social media environment. A user begins interacting with an environment when selecting environment enabled content (1319—FIG. 13) or when a user enters a persistent customized social media environment at 1318 (FIG. 13). In both cases, a connection will be made by the user to the persistent customized social media service. Once the persistent customized social media service is aware that the user wishes to connect, persistent customized social media environment definitions are retrieved or created at 1402 and returned to the user application.

If a user selects content, then the user will be matched to an initial environment at 1401. The initial environment may be the last environment the user was connected to when consuming the content (e.g. a game environment when the user last played a game) or may be selected based on any number of alternative methods. Matching may occur based on content, pre-specified preferences of the user, or metadata associated with the content or the environment. For example, if the user is viewing a recorded program that the user's family has already viewed and shared, the user may be placed in the "my family" environment to see what the family has shared regarding the content. If no suitable environment exists, one may be created at 1402.

At 1404, the persistent customized social media environment definition and content or activity is presented to the persistent customized social media enabled device. At 1408, the device receives the persistent customized social media environment definition, enables any components in the user interface 300 based on the definition, and the user can begin to review the shared content or shared activity at 1410. The user continues to review or participate in shared activity at 1412 until the user desires to share content, activity, or send a message, or the user wishes to launch an application at

1429. If the user decides to share activity or content, at 1414, the user selects a group, selects the content or activity, and activates a sharing command.

If the sharing is an activity or shared content share at 1414, then at 1440, the persistent customized social media environments service acts on the shared content but first receiving the selected group 1441 and content activity which is to be forwarded to the persistent customized social media users and the selection of users. At 1442, the persistent customized social media of service determines an expression or application output type for the user interface based on the current persistent customized social media environment definition, and other activities which were occurring in the current persistent customized social media at the time the share is provided. If an application or module is needed at 1444, then the application or modules retrieved at 1446 are to be provided back to the user persistent customized social media at 1480. If a new app is not needed, or once the app has been presented at 1446, then the content is presented at 1448 to the persistent customized social media environment by forwarding the content to the users at 1480.

If the activity of the user is a messaging activity, at 1420, the message may be one of a personal message 1422, a group message 1424, a environment-wide message at 1426 or a shout at 1428. Once the user selects to share this type of message and identifies what type of message it is on the client device at 1420, the message is received by the persistent customized social media of service at 1450 and transmitted to the directed persistent customized social media users at 1480. Upon receipt of a message at 1450, the persistent customized social media service receives the message and the user group or persistent customized social media destination at 1452 and determines the message type at 1454. Next, an output type is determined at 1456, including, for example, whether or not to animate a user avatar on the user interface with in the persistent customized social media environment. At 1458, the message, posting the message to the avatar, group or persistent customized social media at 1458, and optionally the avatar is rendered or animated at 1460. Once the messages or content are output by the persistent customized social media service, they are returned to the returned to the persistent customized social media at 1430 and 1432 for viewing by the user.

If the user selects to launch an application at 1429, the user may select one of the application launch icons on the interface and application code may be provided by the service at 1462. It should be recognized that the launched application may already by resident on the user's device. Applications may be provided by other users, selected from an application store by other users, provided by content providers or provided by the environment service provider.

FIG. 15A illustrates the creation of a new persistent customized social media environment definition by a user. In 1502, a user selects to create a new persistent customized social media by, for example, selecting the new button 310 within a user interface 300. At 1504, the user selects to find common interests and/or friends to be associated with the persistent customized social media environment definition. The use may also select whether the persistent customized social media is public or private. Once these basic elements are provided, a persistent customized social media environment definition is created at 1506. At 1508, the persistent customized social media service may determine common interests of additional users who may be candidates with similar interests for accessing content within the persistent customized social media environment definition. If the persistent customized social media environment definition is marked private at step 1504, then the system may choose not to provide additional suggestions. At 1510, if the system has determined there are additional users who have common interest, then persistent customized social media additions may be provided at 1510. At 1512, the user is presented with an option as to whether or not the user wishes to add additional friends having common interest of their own choosing or suggested by the persistent customized social media service to the persistent customized social media environment definition. If so, the user selects friends at 1514. At 1516, persistent customized social media elements or modules which may be displayed with any persistent customized social media environment are added or selected. For Example, the user may wish to have an audio display or video chat component added to the persistent customized social media. Any of a number of different types of components may be added to the persistent customized social media definition by the user.

As indicated, at FIG. 15B, the persistent customized social media service may define public persistent customized social media environments based on common interests of participating users. Public persistent customized social media environments may be entered by any user meeting the persistent customized social media definition—which may include viewing the persistent customized social media content or participating in the shared persistent customized social media activity. At 1518, a threshold determination of whether a number of persistent customized social media service users are participating in a common activity or shared content may be made. If so, at 1520, a matching service discussed above with respect to FIG. 2, may cull the user profiles for common interests such as participation in an online game, or viewing a regular sports team on a regular basis. Once common interests are determined a public persistent customized social media to be created based on common interests may be provided at 1522. Users are allowed into the persistent customized social media at 1524 and can select participating in the persistent customized social media by selection of content, or may never join the persistent customized social media again if they never select the content or activity.

Generally, participation in one persistent customized social media environment allows access to participation in persistent customized social media environments having similar interests. For example, if a user is participating in a persistent customized social media environments application and has no football related environment, the user may be placed into a public persistent customized social media with other people who are most similar to the user and watching football. If the user has a private football persistent customized social media (e.g. "my football friends"), the user may be routed to the user's private football environment, but still have access to the "public" persistent customized social media. In another alternative, a user in a persistent customized social media unrelated to football switches to view football content. In this instance, the user may switch to football, but already be in a private environment, "My Family". In this instance, the user may stay in the "My Family" environment, but on the persistent customized social media selection area 320, the user may be presented with the public or specialized groups such as "my football friends" and "Football Public" persistent customized social media environments.

In some instances, users may choose to view shared content at different times. This is made possible by digital video recorders and similar devices.

In such cases, the step of reviewing shared activity (1410) may be performed asynchronously by users. That is, one user may view content in real time as it is presented, and other users may view the same content at a different, "time shifted" point in time. The technology presented herein may utilize asynchronous viewing experiences such as those described in co-pending application Ser. No. 12/970,855 entitled SIMULATION OF GROUP ACTIVITY FROM MULTIPLE ASYNCHRONOUS STREAMS, assigned to the assignee of the present application and hereby incorporated by reference.

FIG. 16 is a flow chart representing time-based encoding of asynchronously viewed content. At 1602, selected shared content for a persistent customized social media environment is presented. This presentation may comprise the broadcast of a movie or live television program on a "first run" or live basis. During the performance of the shared content, users within a persistent customized social media environment may comment using a message to a user, group or persistent customized social media. If persistent customized social media members are not present at 1604, then the comment provided by a user connected to a pace is encoded at 1606 into the content stream in persistent customized social media at a timed synced location within the content stream for replaying layer. This content stream may be stored in the cached content store 160 described above. When a later request to play the content is received at 1608, the content may be displayed from the persistent customized social media service cache store 160, and at 1610, the message will be provided in context at the correct time point of the player. The later-in-time user who is viewing the content will view the message at the correct point in time and context to the original shared presentation. The later-in-time user may select to reply to the comment at 1612. If the recipient for whom the comment is directed is still in the persistent customized social media at 1614, then the recipient may receive the post of the reply in real time at 1616. If not, the comment may be posted to the recipient when the recipient returns to the persistent customized social media at 1618.

In an alternative embodiment, all content and sharing activity consumed in environments may be encoded with meta-data at 1606. Tagging of sharing data and content with user activities, or specific links and information created by users, allows the technology to provide suggestions to users based on current activity in the environment. For example, each environment allows for various forms of communication and content sharing, including video, text, images music, links and the like. When a user connected to an environment defeats a particularly difficult opponent in a game, the user can link to a video of how the user did it which can be shared with the users friend or anyone beats that opponent. In addition, when a user seeks help in how to defeat the opponent in the game, the user can see videos of how others accomplished this task.

Figure 17:
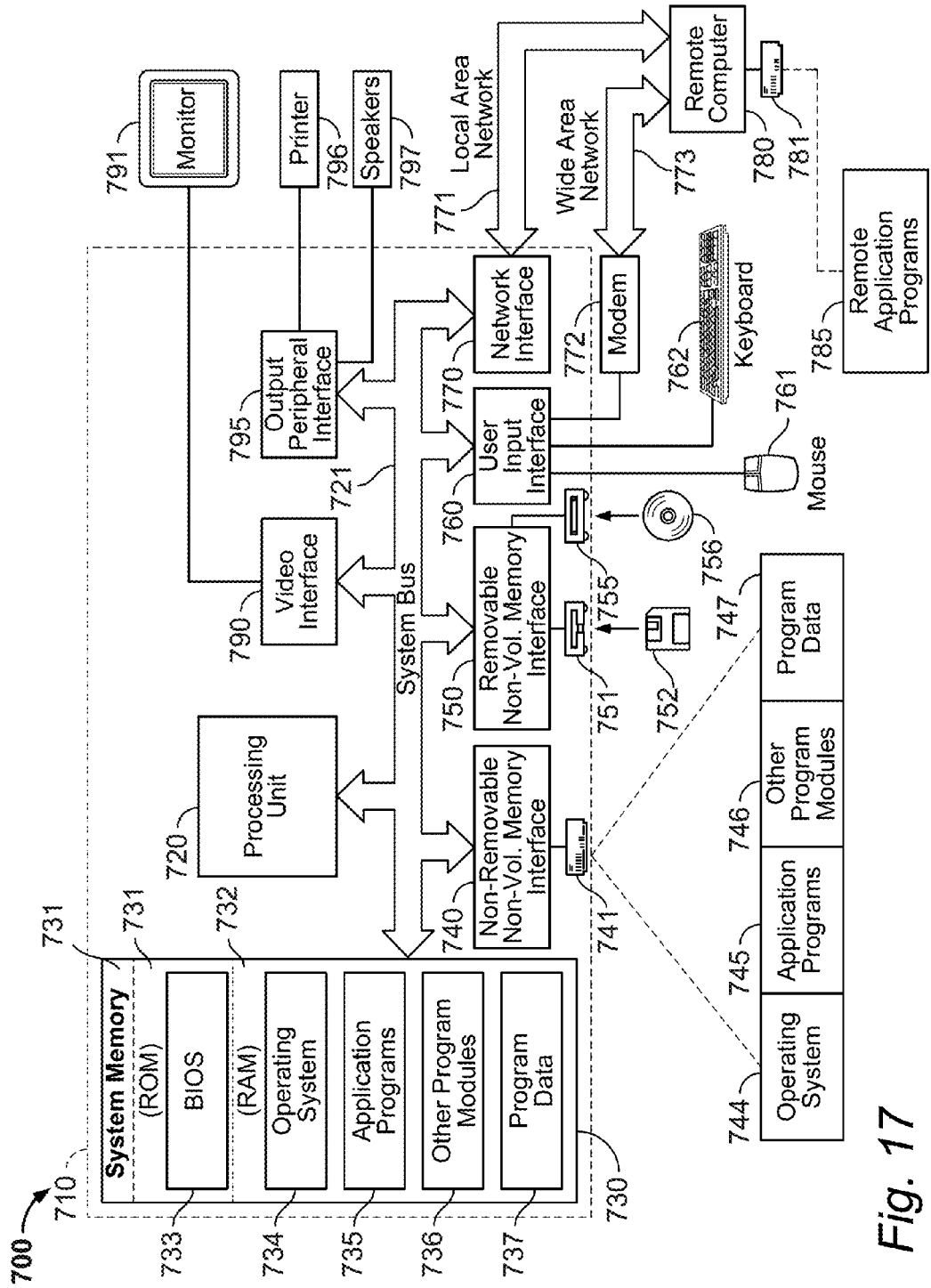
FIG. 17 illustrates a processing device suitable for implementing the present technology

FIG. 17 illustrates an example of a suitable computing system environment which may be used in the foregoing technology as any of the processing devices described herein. Multiple computing systems may be used as servers to implement the persistent customized social media service.

With reference to FIG. 17, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 740 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 20 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Figure 18:
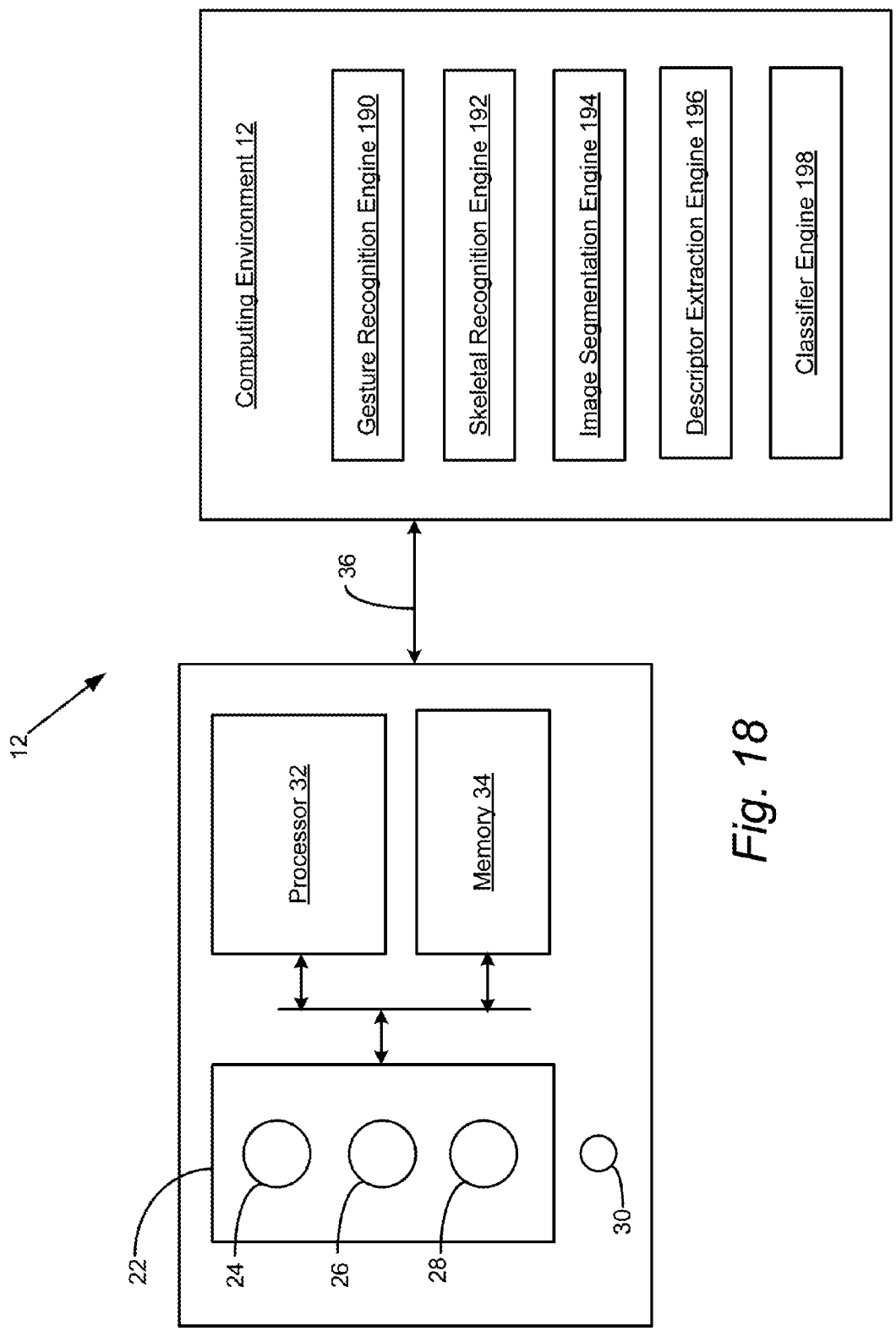
FIG. 18 illustrates a capture device suitable for use with any of the above processing devices.

FIG. 18 illustrates a capture device 20 and programs implemented in computing device 12 for implementing a target recognition, analysis, and tracking system 10 which may be used to recognize, analyze, and/or track a human target such as the user 50, 52. In certain embodiments of the present technology, the capture system may be utilized to identify users of the persistent customized social media environment by reference to gestures and personal characteristics derived using the capture device 20.

Embodiments of the system 10 include implementing 1 target recognition, analysis, and tracking system using computing environment 12 and capture device 20.

Capture device 20 for captures image and audio data relating to one or more users and/or objects sensed by the capture device. In embodiments, the capture device 20 may be used to capture information relating to body and hand movements and/or gestures and speech of one or more users, which information is received by the computing environment and used to render, interact with and/or control aspects of a gaming or other application. Embodiments of the target recognition, analysis and tracking system may be connected to the audio/visual (A/V) device 16. The device 16 may for example be a television, a phone, a monitor for a computer, a high-definition television (HDTV), or the like that may provide game or application visuals and/or audio to a user.

A variety of other gestures, control actions and applications may be enabled by the present technology for recognizing and tracking hand motions, some of which are described in further detail below. Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

The capture device 20 that may be used in the target recognition, analysis, and tracking system may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

The capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

The image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. The capture device 20 may be in communication with the computing environment 12 via a communication link 36. The computing environment 12 may further include a gesture recognition engine 190 for recognizing gestures as explained below. In accordance with the present system, the computing environment 12 may further include a skeletal recognition engine 192, an image segmentation engine 194, a descriptor extraction engine 196 and a classifier engine 198.

Figure 19:
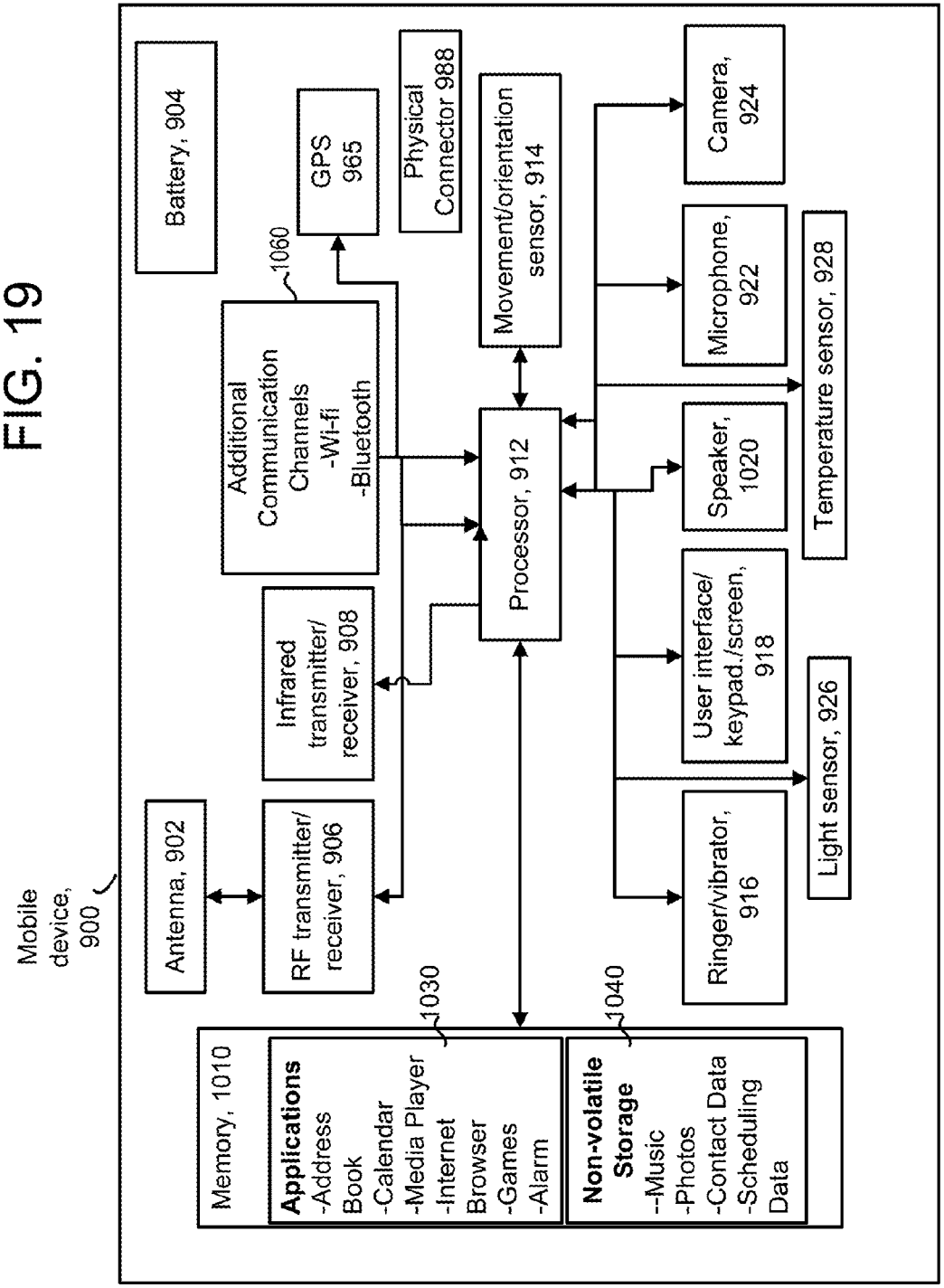
FIG. 19 illustrates a mobile processing device suitable for implementing the present technology.

FIG. 19 is a block diagram of an exemplary mobile device which may operate in embodiments of the technology. Exemplary electronic circuitry of a typical mobile phone is depicted. The phone 900 includes one or more microprocessors 912, and memory 1010 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 1060 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 1020, a microphone 922, a camera 924, a light sensor 926 and a temperature sensor 928.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 1020 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS transceiver 965 utilizing satellite-based radio navigation to relay the position of the user applications is enabled for such service.

The example computer systems illustrated in the figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Figure 20:
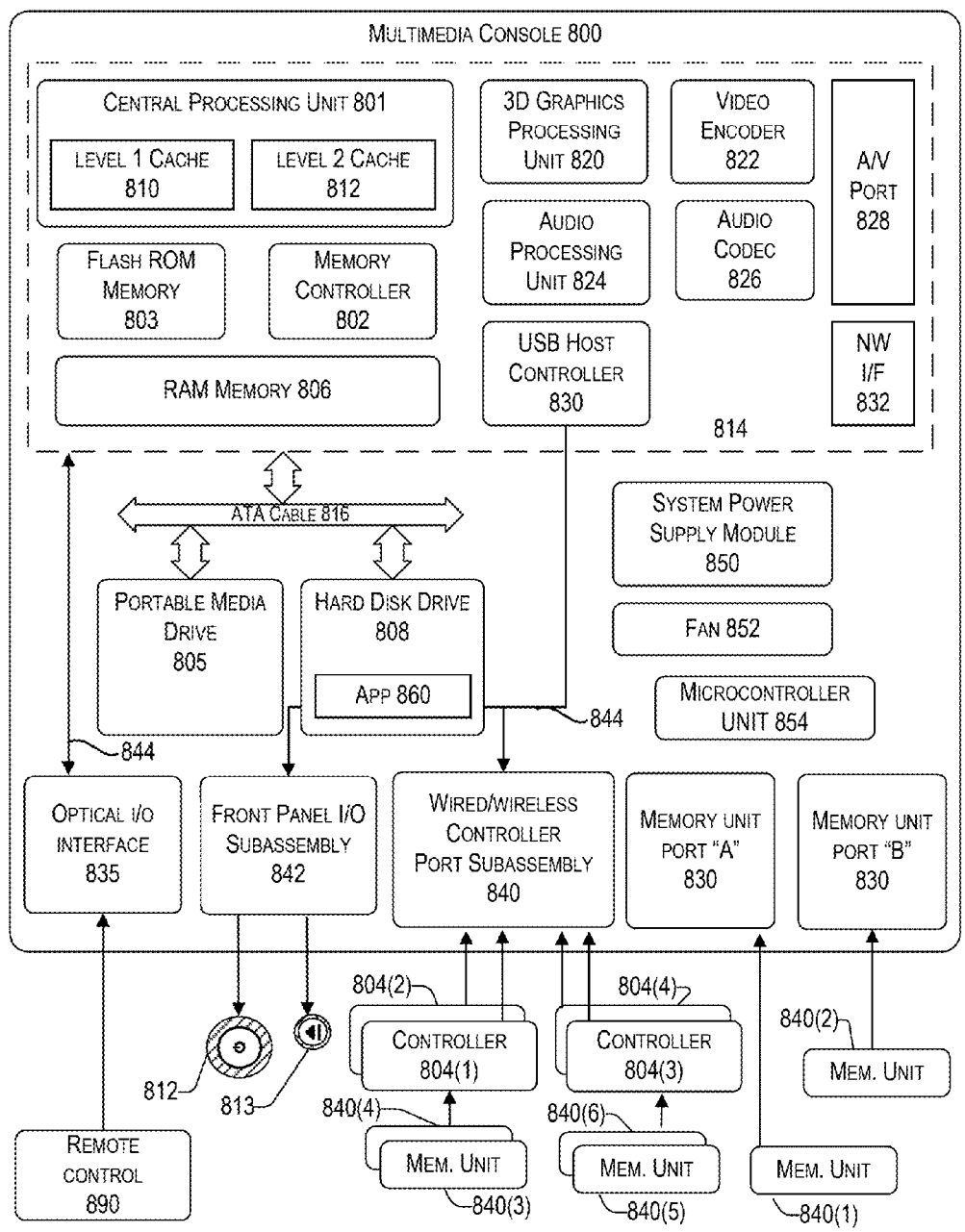
FIG. 20 illustrates a second processing device suitable for implementing the present technology.

FIG. 20 is a block diagram of another embodiment of a computing system that can be used to implement the computing system 12. In this embodiment, the computing system is a multimedia console 800, such as a gaming console. As shown in FIG. 20, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 18 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 18 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16, a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of sharing a media experience, comprising:
   providing a sharing application to a media display device, the sharing application responsive to a common shared content experience service, the content experience service hosting a plurality of persistent customized social media environments, each persistent social media environment in the service having a plurality of users and maintained for a duration of the common shared content experience;
   receiving a persistent customized social media environment definition from a user via the sharing application, the persistent customized social media environment definition including an identification of other users to be included in the environment, a common shared content experience, and one or more content experience modules provided in the application;
   responsive to a user indicating a desire to participate in the persistent customized social media environment, outputting the persistent customized social media environment definition to configure the sharing application for user participation;

providing communications between the users participating in the persistent customized social media environment based on user input and providing an indicator notifying at least one of the users in the persistent customized social media environment of activity in a second persistent customized social media environment, different from the persistent customized social media environment and in which the at least one user is also participating and selectively switching between the first and second persistent customized social media environment;

syncing persistent customized social media communications between users to the common shared content experience;

responsive to one or more of the users connecting to the persistent customized social media environment subsequent to communications being provided between the users participating in the persistent customized social media environment, providing the communications to the one or more users connecting subsequently, the communications provided at a point in time and context corresponding to that of the common shared content experience; and receiving a selection of third party content from one or more users identified in the definition and connected to the environment, the selection adding the third party content to an activity stream within the environment such that the common shared content experience of the users participating in the first and second persistent customized social media environments are displayed and selectively removed.

2. The method of claim 1 wherein the method further includes notifying persistent customized social media member users when a user creates a persistent customized social media including persistent customized social media member users in the persistent customized social media environment definition.

3. The method of claim 1 further including tracking network enabled user activities and suggesting additional users for a persistent customized social media environment definition.

4. The method of claim 1 wherein the providing communications includes:
receiving a selection from the user of a recipient to receive a private message;
receiving the private message content; and
routing the private message content to the recipient.

5. The method of claim 1 wherein the providing communications includes:
receiving a selection of a group of users who are members of the persistent customized social media environment definition as recipients of a group message;
receiving group message content; and
routing the group message content to the recipients.

6. The method of claim 1 wherein the providing communication services includes outputting avatars for users participating in a environment.

7. The method of claim 6 wherein the providing communication services outputting includes animating user avatars based on communication activity received for or expressed by an owner of the avatar.

8. The method of claim 1 further including, responsive to a user indicating a desire to participate in the second persistent customized social media environment, outputting a second persistent customized social media environment definition to configure the sharing application for user participation in the second persistent customized social media environment; and
providing communications between the users participating in the second persistent customized social media environment based on user input.

9. A system providing a data store including a persistent definition of a persistent customized social media environment, the system comprising:
a data store including a plurality of persistent customized social media environment definitions, each persistent customized social media environment definition including a user list of users allowed to connect to the environment, one or more synced content experiences and an application definition including a plurality of modules, each persistent customized social media environment having a plurality of users and maintained for a duration of a common shared content experience;
a user profile database including user profile information regarding user online activities and associations to persistent customized social media environment definitions of which the user is a member;
an application store configured to provide a persistent media environment application responsive to a request for the application from a user, each application including content experience modules one of the modules being specified by each persistent customized social media environment definition, each definition specifying at least a media display module adapted to output media shared by each user in the persistent customized social media environment in an customized social media environment user interface;
an interface receiving third party content experiences associated with and selected by a user of the persistent customized social media environment, the user selectively sharing the third party content experiences with one or more other users in another persistent customized social media environment, wherein the interface includes an activity queue in which the commonly shared content of the plurality of users are displayed and selectively removed; and
a communications server receiving messages from users, the messages associated with a persistent customized social media environment definition and destined for users in said persistent customized social media environment definition or a subset thereof, wherein
the messages are provided to one or more users when the messages include time-synced content with the output media shared by each user in the persistent customized social media environment.

10. The system of claim 9 wherein the user profile information includes information on user activities in network enabled content experiences on third party systems.

11. The system of claim 10 wherein the communications server includes a private messaging system, a group messaging system and a persistent customized social media messaging system.

12. The system of claim 10 wherein the application store includes code executable in a browser to implement a user interface on a client device when the code is transmitted to the client device, the code interfacing with the data store, profile database, interface and communications server when executed on a client device.

13. The method of claim 1 further comprising automatically tagging shared content to provide suggestions to the users based on current activity in the environment.

\* \* \* \* \*

UNITED STATES PATENT AND TRADEMARK OFFICE
CERTIFICATE OF CORRECTION

PATENT NO. : 9,782,680 B2  
APPLICATION NO. : 13/315946  
DATED : October 10, 2017  
INVENTOR(S) : Kenneth A. Lobb et al.

Page 1 of 1

It is certified that error appears in the above-identified patent and that said Letters Patent is hereby corrected as shown below:

On the Title Page

-- (73) Assignee: FUTUREWEI TECHNOLOGIES, INC., Plano, TX (US) --  
Should read:  
-- (73) Assignee: MICROSOFT TECHNOLOGY LICENSING, LLC, Redmond, WA (US) --

Signed and Sealed this  
Twenty-sixth Day of November, 2019

Andrei Iancu  
*Director of the United States Patent and Trademark Office*